(12) United States Patent
Fradin et al.

(10) Patent No.: US 12,066,584 B2
(45) Date of Patent: Aug. 20, 2024

(54) FAST POWER ON METHOD FOR MARINE ACQUISITION STREAMER

(71) Applicant: SERCEL, Carquefou (FR)

(72) Inventors: Nicolas Fradin, Nantes (FR); Xavier Brun, Nantes (FR)

(73) Assignee: SERCEL, Carquefou (FR)

( * ) Notice: Subject to any disclaimer, the term of this patent is extended or adjusted under 35 U.S.C. 154(b) by 0 days.

(21) Appl. No.: 17/873,244

(22) Filed: Jul. 26, 2022

(65) Prior Publication Data

US 2022/0357477 A1    Nov. 10, 2022

Related U.S. Application Data

(62) Division of application No. 16/590,699, filed on Oct. 2, 2019, now Pat. No. 11,480,699.

(51) Int. Cl.

| H04L 12/437 | (2006.01) |
| G01S 13/00 | (2006.01) |
| G01V 1/20 | (2006.01) |
| G01V 1/22 | (2006.01) |
| G01V 1/38 | (2006.01) |

(52) U.S. Cl.
CPC .............. *G01V 1/38* (2013.01); *G01S 13/00* (2013.01); *G01V 1/201* (2013.01); *G01V 1/22* (2013.01); *H04L 12/437* (2013.01); *G01V 2200/14* (2013.01)

(58) Field of Classification Search
CPC . G01V 1/38; G01V 1/201; G01V 1/22; G01V 2200/14; G01S 13/00
See application file for complete search history.

(56) References Cited

U.S. PATENT DOCUMENTS

| 5,883,856 A | 3/1999 | Carroll et al. |
| 9,383,467 B2 | 7/2016 | Duboue et al. |
| 9,459,944 B2 | 10/2016 | Hillesund et al. |
| 9,641,245 B2 | 5/2017 | Al-Walaie et al. |

(Continued)

FOREIGN PATENT DOCUMENTS

| EP | 0852018 A1 | 7/1998 |
| EP | 2447737 A1 | 5/2012 |

(Continued)

OTHER PUBLICATIONS

International Search Report and Written Opinion received in corresponding Application No. PCT/IB2020/000807, dated Apr. 15, 2021.

(Continued)

*Primary Examiner* — Krystine E Breier
(74) *Attorney, Agent, or Firm* — PATENT PORTFOLIO BUILDERS PLLC

(57) ABSTRACT

A method for automatically propagating a voltage along a marine seismic streamer, the method including detecting, at an ith concentrator of the streamer, a first voltage applied at a first high-voltage rail HV1; detecting, at the ith concentrator of the streamer, a second voltage applied at a second high-voltage rail HV2, the first and second high-voltage rails extend over the entire streamer; checking a predetermined condition at a first local controller of the ith concentrator; and closing a first switch SW1, which propagates the first high-voltage rail HV1, when the predetermined condition is satisfied.

11 Claims, 20 Drawing Sheets

(56) References Cited

U.S. PATENT DOCUMENTS

2008/0285379 A1* 11/2008 Bishop .................... G01V 1/22
                                                  367/14
2008/0310298 A1    12/2008 Drange
2012/0106012 A1*  5/2012 Westrum ................. G01V 1/38
                                                  361/57

FOREIGN PATENT DOCUMENTS

EP    2720069 A1    4/2014
WO    9711394 A2    3/1997

OTHER PUBLICATIONS

International Searching Authority; "Invitation to Pay Additional Fees, and Where Applicable, Protest Fee (PCT Article 17(3)a) and Rule 40.1 and 40.2(e)" mailed Jan. 29, 2021.

* cited by examiner

FAST POWER ON METHOD FOR MARINE ACQUISITION STREAMER

BACKGROUND

Technical Field

Embodiments of the subject matter disclosed herein generally relate to methods and systems for powering on a marine streamer that has plural seismic sensors and, more particularly, to mechanisms and techniques for automatic and quick propagation of a voltage through a marine streamer, especially when the streamer is deployed in water.

Discussion of the Background

Seismic data acquisition and processing may be used to generate a profile (image) of geophysical structures under the ground (subsurface). While this profile does not provide an accurate location for oil and gas reservoirs, it suggests, to those trained in the field, the presence or absence of such reservoirs. Thus, providing a high-resolution image of the subsurface is important, for example, to those who need to determine where the oil and gas reservoirs are located.

For marine acquisition, such a high-resolution image may be obtained with a seismic acquisition system as now discussed. The seismic acquisition system 100 includes, as illustrated in FIG. 1, a vessel 102 that tows plural streamers 110 (only one is visible in the figure) and a seismic source array 130. Streamer 110 is attached through a lead-in cable (or other cables) 112 to vessel 102, while source array 130 is attached through an umbilical 132 to the vessel. A head float 114, which floats at the water surface 104, is connected through a cable 116 to the head end 110A of streamer 110, while a tail buoy 118 is connected, through a similar cable 116, to the tail end 110B of streamer 110. Head float 114 and tail buoy 118 are used, among other things, to maintain the streamer's depth. Seismic sensors 122 are distributed along the streamer and configured to record seismic data. Seismic sensors 122 may include a hydrophone, geophone, accelerometer or a combination thereof. Positioning devices 128 (also known as birds) are attached along the streamer and controlled by a global controller 126 for adjusting a position of the streamer according to a survey plan. Source array 130 has plural source elements 136 like air guns. The source elements are attached to a float 137 to travel at desired depths below the water surface 104. The positions of both source elements 136 and recording sensors 122 may be estimated based on GPS systems 124 and recorded together with the seismic data in a storage device 127 onboard the vessel. Controller 126 has access to the seismic data and may be used to achieve quality control or even fully process the data. Controller 126 may also be connected to the vessel's navigation system and other elements of the seismic survey system, e.g., positioning devices 128.

The streamer 110 is typically a long cable that includes, among the sensors noted above, a strength cable, a communication cable, and a voltage cable. As illustrated in FIG. 2, the streamer 110 is made of plural segments 202$i$, which are connected to each other by corresponding data processing units 204$i$ (also called concentrators). A streamer may include many segments and many data processing units. A data processing unit may have a processor that partially processes the seismic data received from the seismic sensors (e.g., digitizes the data and/or consolidates the data from plural sensors into a single signal) before sending it to the global processor 126, on board of the vessel 102.

Modern data processing units 204$i$ have also a memory and other electronics that run on various operating systems. Such data processing units need a certain amount of time to be booted up or rebooted. Note that any time that the streamer is launched into water and started, it needs to be booted. Also, any time that a problem is detected in the streamer and/or in the global controller 126, the streamer may need to be rebooted. However, a current data processing unit needs a couple of seconds to be booted/rebooted. Technical requirements for the new streamers demand that the entire streamer should be identified in 30 s or less. This requirement is not possible to be achieved with the current streamers that run the current data processing units.

Thus, there is a need to have a streamer configuration that can be identified by a global controller in 30 s or less, regardless of the booting time of the data processing units that make up the streamer.

SUMMARY OF THE INVENTION

According to an embodiment, there is a marine seismic streamer that includes plural concentrators, plural segments interposed with the plural concentrators so that a concentrator of the plural concentrators is sandwiched between two segments of the plural segments, a first high-voltage rail HV1 that extends along the plural concentrators and the plural segments, and a second high-voltage rail HV2 that extends along the plural concentrators and the plural segments. In each given concentrator i of the plural concentrators, there is a first switch SW1 placed along one of the first high-voltage rail HV1 and the second high-voltage rail HV2, a second switch SW2 placed between the first high-voltage rail HV1 and the second high-voltage rail (HV2), a first local controller implemented in hardware, and a second local controller implemented in a combination of hardware and software, and having an operating system, the first local controller being separated from the second local controller. The first local controller and the second local controller are electrically connected to the first and second switches SW1 and SW2 and configured to close or open the first local controller and the second local controller.

According to another embodiment, there is a method for automatically propagating a voltage along a marine seismic streamer. The method includes detecting, at an ith concentrator of the streamer, a first voltage applied at a first high-voltage rail HV1; detecting, at the ith concentrator of the streamer, a second voltage applied at a second high-voltage rail HV2, wherein the first and second high-voltage rails extend over the entire streamer; checking a predetermined condition at a first local controller of the ith concentrator; and closing a first switch SW1, which propagates the first high-voltage rail HV1, when the predetermined condition is satisfied.

According to still another embodiment, there is a method for identifying and insulating a fault in a marine seismic streamer. The method includes detecting a fault on a first high-voltage rail HV1 or a second high-voltage rail HV2, wherein the first and second high-voltage rails extend over the entire streamer; placing first to third software flags F1 to F3 at an ith concentrator, before the fault, an (i+1)th concentrator, after the fault, and an (i+2)th concentrator, respectively; and restarting (1204) an automatic voltage propagation procedure of the streamer. The first to third flags F1 to F3 are controlling a first local controller in a corresponding concentrator, and the first to third flags F1 to F3 are generated by a second local controller in the corresponding concentrator. The second local controllers are slower to reboot than the first local controllers.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a marine streamer having two high-voltage rails, which allow to power the different components (i.e., concentrators) placed along the entire streamer. However, the embodiments to be discussed next are not limited to such streamer or to only two high-voltage rails, but may be implemented for other systems having two or more high-voltage rails.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a streamer that has at least two high-voltage rails that extend along the various components of the streamer. The high-voltage rails are configured to have hardware switches (or interrupters) along their length and also hardware switches between the rails. These hardware switches have dual control. They can be controlled by a hardware management circuit located (in a corresponding data processing unit) next to the switches, i.e., locally, but also from a global controller, in software. The interplay between the software control and the hardware management circuit, which is discussed in detail later, ensures that the towing vessel recognizes the streamer, when initiated or restarted, in 30 s or less, even if some components of the streamer need a longer cumulative time for booting/rebooting.

Figure 1:
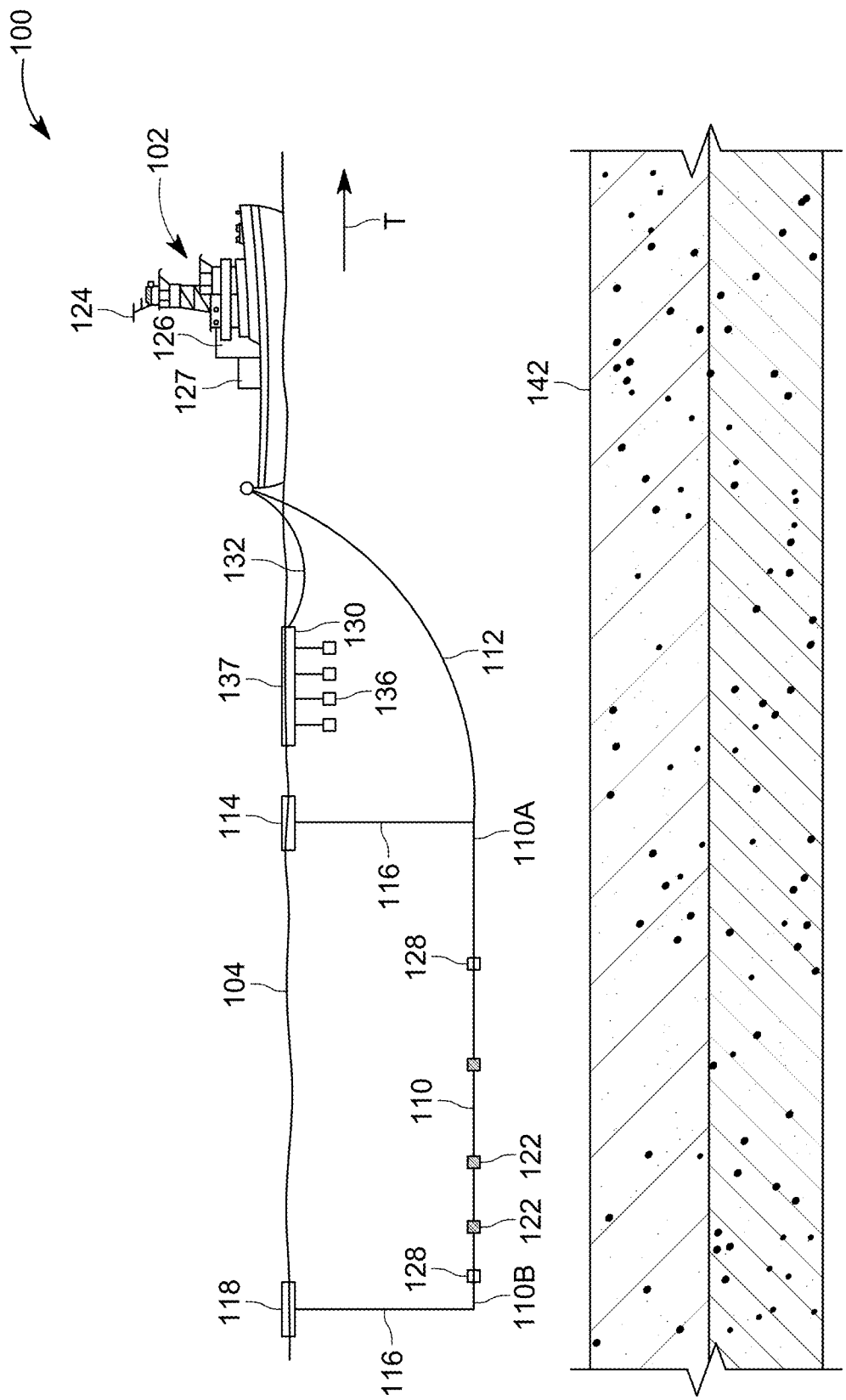
FIG. 1 illustrates a marine seismic survey system.
Figure 2:
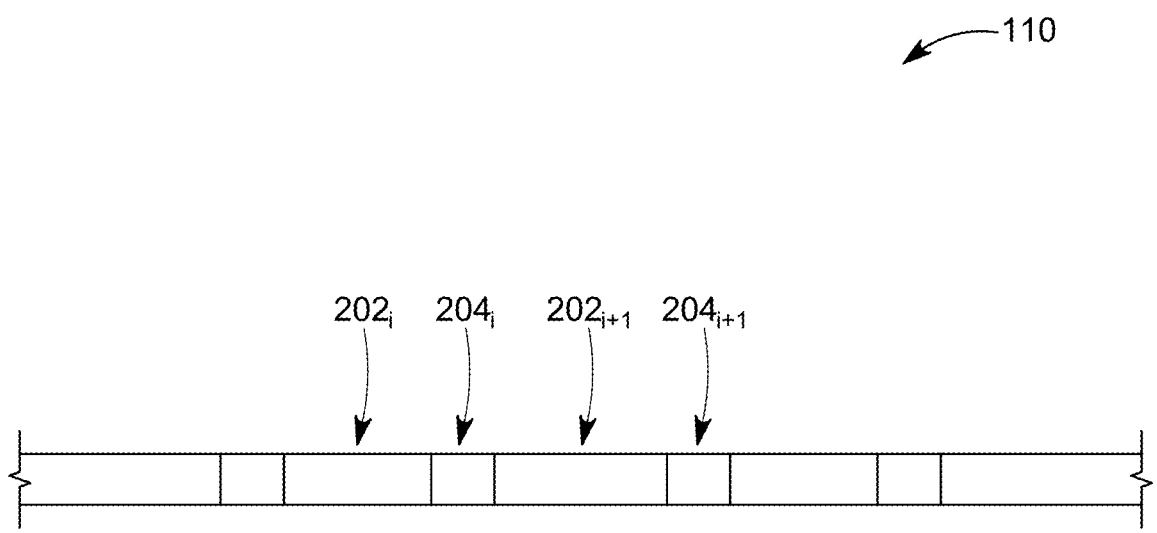
FIG. 2 illustrates plural segments and plural concentrators that make up a streamer of the seismic survey system.
Figure 3:
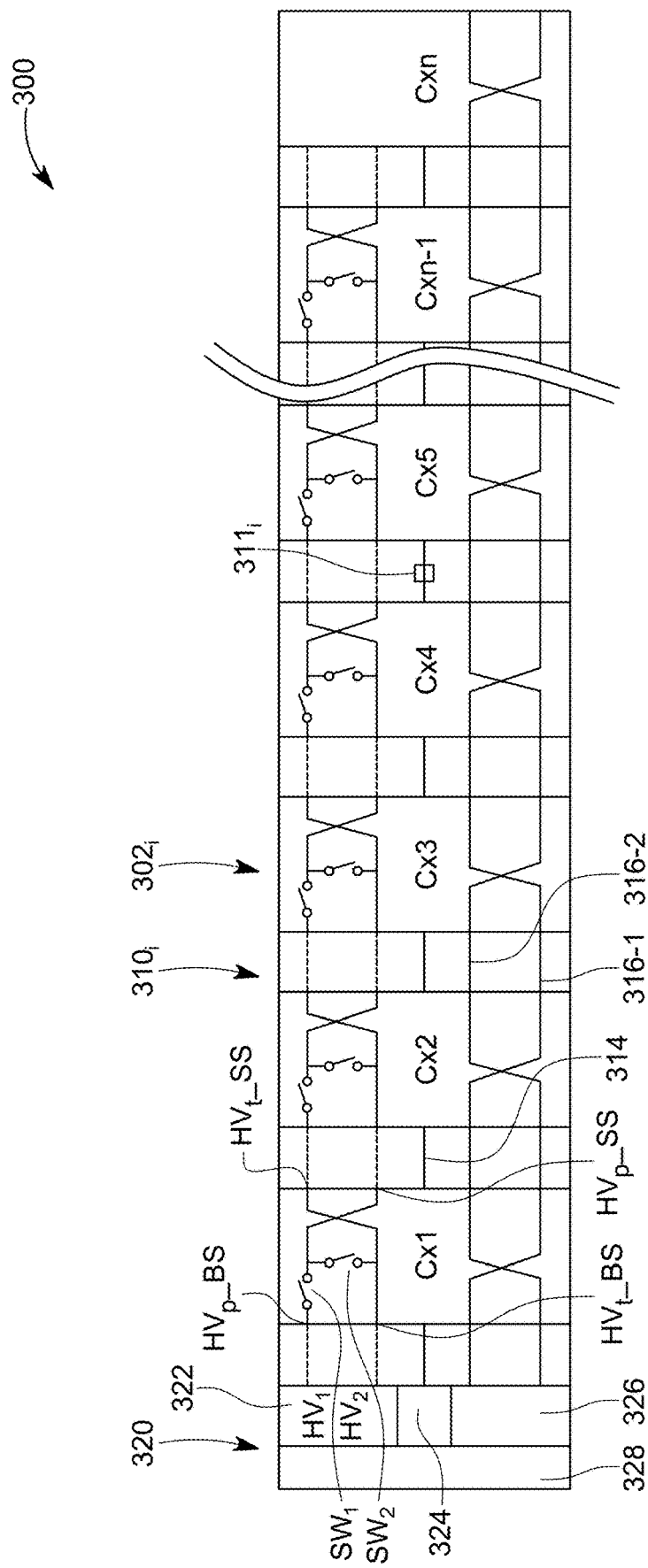
FIG. 3 shows the plural segments and plural concentrators of a streamer and the various cables that connect the concentrators to each other.

According to the embodiment illustrated in FIG. 3, a streamer 300 includes plural segments 310$i$ connected to each other through corresponding concentrators 302$i$. The index "i" can vary from 1 to 100. Other values for this index are not excluded. Each segment 310$i$ may include one or more sections. A section is defined as being a continuous piece of the streamer that has its ends provided with connectors. A streamer section is 100 to 200 m long and includes plural seismic sensors 311$i$ distributed along it. FIG. 3 shows for simplicity a single seismic sensor. However, each section can include more than one seismic sensor. Plural sections are connected directly to each other to form a segment. A bird or other position control device may be inserted between adjacent sections or segment for controlling a position of the streamer. A concentrator connects one segment to another segment. In a streamer, there are plural concentrators. A streamer may include up to 20 concentrators. More or less concentrators may be used.

The streamer 300 is connected to a vessel 320 that is configured to tow the streamer in water. The vessel houses a power source 322, a data server 324, a communication server 326, and a global controller 328. The power source 322 may provide direct or alternating current to the streamer. For example, the power source 322 provides high-voltage to the high-voltage rails HV1 and HV2. In one application, the high-voltage may be about a few hundreds of volts, for example 600 V. Other values are possible.

The data server 324 may be connected to a telemetry line 314 that extends along the entire streamer. The telemetry line 314 serves as the medium for transmitting the collected seismic data, from the seismic sensors, between the concentrators. The telemetry line 314 may be implemented as a metallic conductor, an optical cable, etc. The communication server 326 is connected to one or more communication cables 316-1 and 316-2. Although FIG. 3 shows two communication cables that extend along the entire streamer, fewer or more cables may be used. The communication cables are connected to each of the concentrators 302$i$ and provide a medium for transmitting commands and/or instructions between the vessel and each concentrator, and for retrieving the seismic data. The software commands for closing or opening the hardware switches discussed later may be transmitted along these communication cables. Other components of the streamer are not shown, for example, a strength member that extends along the entire streamer for providing the physical strength necessary for the streamer to not break as the streamer is towed in water, as these details are known in the art.

Figure 4:
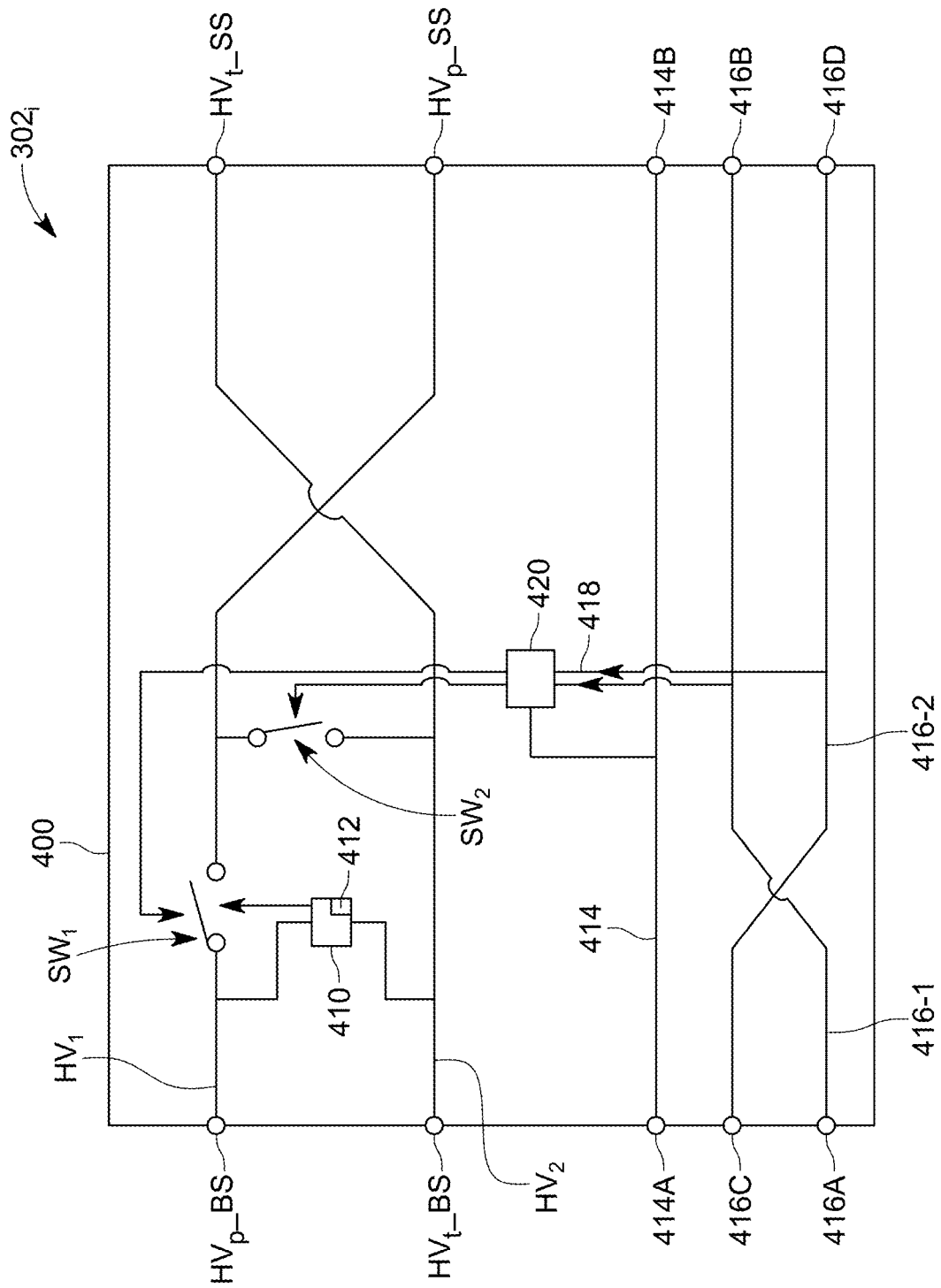
FIG. 4 shows a possible configuration of a concentrator of a streamer.

A concentrator 302i is illustrated, in one embodiment, in FIG. 4. The concentrator 302i has a housing 400 that hosts two distinct and separated controllers, a first controller 410 (for example, a complex programmable logic device) and a second controller 420 (which may be the main controller of the concentrator). The first controller 410 may include (1) a processor and associated memory, or (2) an integrated circuit, or (3) a field programmable gate arrays, or (4) an application-specific integrated circuit, or (5) a combination of these elements. The second controller 420 may be a similar device, but the second controller stores a software operating system and in order to boot or reboot it, it takes a couple of seconds as the operating system needs to be loaded and initialized. To the contrary, the first controller 410 does not need time to be booted or rebooted, i.e., it can be started in a matter of milliseconds, or less than 1 s, as the first controller does not have an operation system.

The first controller 410 is configured to implement the hardware management circuit discussed above, i.e., to control the closing and/or opening of the first switch SW1 and the second switch SW2. The first switch SW1 may be implemented in a transistor or equivalent electronic circuits. The second switch SW2 may be implemented in a similar manner. The first controller 410 is configured to close or open the first switch SW1, independent of software instructions received from the vessel. For example, in one embodiment, the first controller 410 is electrically connected to the HV1 and HV2 rails, as shown in FIG. 4. The first controller 410 has the capability to measure whether a voltage or current is present in the rail. The first controller 410 may also be configured, through its hardware and not software, to close the switch SW1 if first a first voltage at the first HV1 rail is detected, followed by detection of a second voltage at the second HV2 rail. Even more, in one application, the first controller 410 has a timer 412, which is configured to start as soon as the voltage is detected at the first rail HV1. The timer may be configured to run for a given time t, for example, 200 ms. Other times may be used for the timer, for example, any number less than 200 ms. Only if the second voltage at the second rail HV2 is detected within this predetermined time, then the first controller 410 would automatically close the first switch SW1. If the second voltage is detected at the second rail HV2 later than the time t, after the first voltage at the first rail HV1 has been detected, the first controller 410 would not close the first switch SW1. Further, if the first controller 410 detects first the second voltage at the second rail HV2 and then the first voltage at the first rail HV1, the first controller will not close the first switch SW1 and software associated with this system can take control to determine why this happens. A couple of instances where the software is doing this are discussed later. All these responses of the first controller 410 are implemented in hardware. In this embodiment, the default position of the first switch SW1 is open. The configuration discussed in this embodiment with regard to the first switch SW1 and the settings of the first controller 410 are implemented by the hardware management circuit that controls the first switch. A complementary software control of the first switch is discussed later.

The housing 400, which is water proof, is provided with two input high-voltage ports and two output high-voltage ports. The first input high-voltage port is called herein the HVp_BS, which means High Voltage Propagated Boat Side. The corresponding output high-voltage port is called herein the HVp_SS, i.e., the High Voltage Propagated Sea Side port. Note that the letter "p" in HVp notation means that the HV propagates via a switch (SW1 in this case) along the voltage rail. The other two ports are similar to these two ports except that the HV is called $HV_t\_BS$ and $HV_t\_SS$, where the letter "t" indicates that the HV goes "through" the corresponding concentrator, i.e., there is no switch along the corresponding rail at the corresponding concentrator. It is noted that FIG. 4 shows that the two rails HV1 and HV2 cross each other once, inside the concentrator, and change their positions. This feature has a certain effect in the propagation of the voltage, as discussed later.

The same high-voltage may be applied on each of the HV rails. For a long streamer, for example, 10 to 15 km, a single HV rail would not be enough to provide the necessary voltage to all the components of the streamers (i.e., seismic sensors and other concentrators down the streamer). Thus, two HV rails are necessary for the long streamers. More than two HV rails may be used.

The second controller 420 is implemented to be controlled by software. This means, that a software instruction 418 may be transmitted from the vessel, along the communication lines 416-1 and/or 416-2, to the second controller. The second controller 420 is electrically connected to each of the first and second switches SW1 and SW2 and configured to close or open them, individually and separately, based on software commands received from the global controller 328. Further, the second controller 420 is configured to receive "flags," i.e., software instructions, which prevent or determine a certain action, for example, to prevent the first controller 410 to close the first switch SW1, as will be discussed later. These flags may be then passes to the first controller 410 to change the behavior of this controller.

FIG. 4 also shows that there are data ports 414A and 414B on the housing that are configured to connect to the telemetry cable 312 (see FIG. 3) and the internal telemetry cable 414 is connected to the second controller 420 so that data from the seismic sensors may be partially processed in the concentrators, if desired. Further, communication ports 416A to 416D are provided on the housing 400 and they connect to corresponding communication cables 316-1 and 316-2. Note that in one embodiment, the communication cables 316-1 and 316-2 crosses each other and change their positions, similar to the first and second HV rails, as shown in FIG. 4.

Each concentrator 302i is designed and configured to recreate a HV from one rail to the other one in case that one HV rail or another concentrator fails. This feature is achieved with the second switch SW2, which connects the first rail HV1 to the second rail HV2 when one of the two rails fails. Note that the default position of the second switch SW2 in each concentrator is open.

Having this configuration of the concentrators 302i, it is possible to implement an automatic propagation of the high-voltage through the first and second rails, when the streamer is started or rebooted, and the propagation of the high-voltage is not slowed down by the booting or rebooting of the second controller 420 of each concentrator 302i. As previously discussed, the first controller has no operating system and thus, it has a minimal delay when started, determined by the inherent response time of the transistors present in the controller. However, the second controller is running an operating system, which require a long time to restart, due to the various software commands that need to be run.

Figure 5:
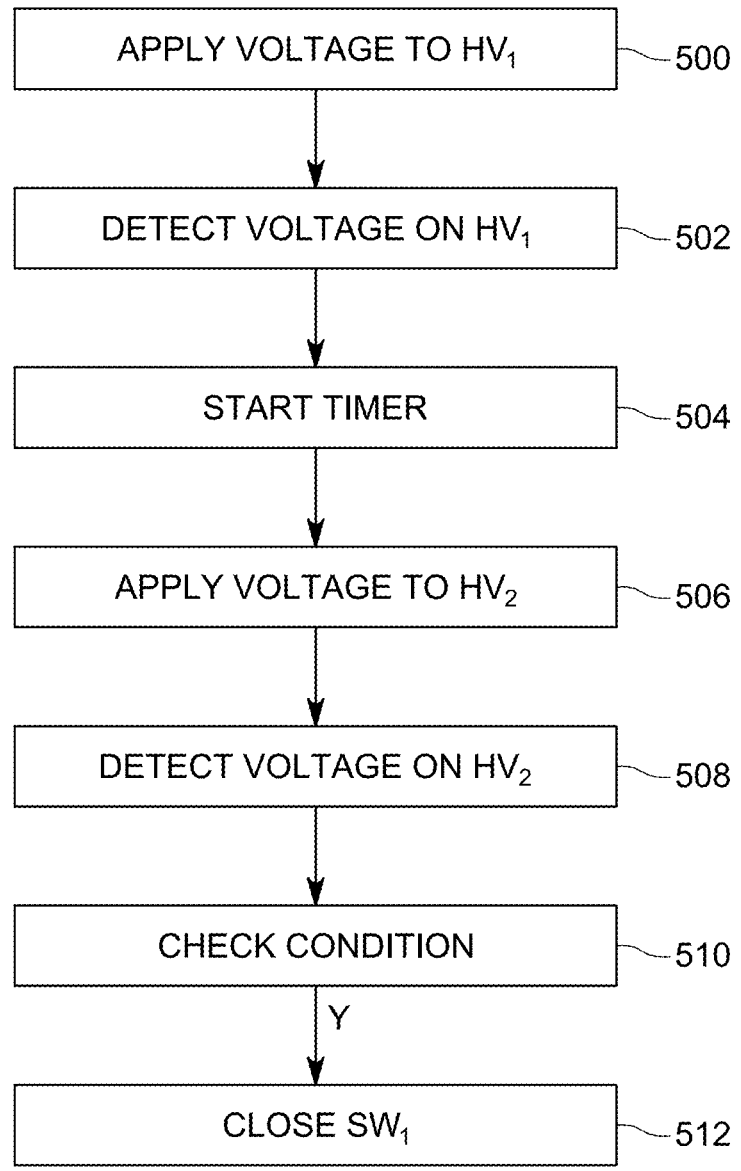
FIG. 5 is a flowchart of a method for automatically propagating a voltage along the streamers with no down time due to the booting of various elements of the streamer.

This automatic propagation of the high-voltage through the rails along the streamer is now discussed with regard to FIG. 5. For this method, it is assumed that there is no fault along the rails or in any of the concentrators. In this regard, note that faults associated either with the rails or the concentrators are separately discussed in the following embodiments. The method illustrated in FIG. 5 starts with a step 500 of applying the first voltage to the first rail HV1. The first voltage is applied by the global controller 328, located on the vessel or at the head of the streamer. In step 502, the first controller 410, i.e., a first local controller of the first concentrator $302_1$, detects whether there is a voltage on the first rail HV1. If the first voltage is detected in step 502, the first local controller 410 starts a timer in step 504. As discussed above, the timer counts down a given time, which may be 200 ms or less. In step 506, the global controller 328 applies the second voltage to the second rail HV2. The first local controller 410 measures in step 508 the second voltage on the second rail HV2. The first voltage may be the same or different from the second voltage.

In step 510, the first local controller 410 verifies whether the second voltage on the second rail HV2 has been detected and whether this detection has been made before the countdown timeout, i.e., the first local controller checks a condition. This condition may be changed as desired by the operator of the streamer. If the second voltage has been detected before the countdown reached zero, the first local controller 410 closes the first switch SW1. Note that this action does not involve receiving any signal or software instruction from the vessel. This functionality of closing the first switch SW1 when voltages are detected on the first and second rails is termed herein as the hardware management functionality, which is implemented locally at each concentrator $302i$ in hardware. Note that if the second voltage is applied first to the second rail HV2 and the first voltage is applied second to the first rail HV1, the system is configured to give control to the second controller 420 (this situation is discussed later).

This process then advances to the next concentrator, where again the voltages on the first and second rails are detected/measured. As long as the first and second voltages are detected in the order mentioned above, within the time set up in each timer, it is considered that no fault is present along the streamer. Also, this process is automatic and fast as the first local controller of each concentrator does not need any time to reboot (the starting time of the first local controller is insignificant comparative to the starting time of the second local controller). However, in step 510, if one of the voltages is not detected or the second voltage is detected first and then the first voltage, or if the second voltage is detected after the timer has counted down the given time, then the first switch SW1 is not opened, and the first local controller or the second local controller is configured to report an error or fault 600 (see FIG. 6) to the global controller 328. As long as there is no fault along the first and/or second high-voltage rails in the streamer, the process described above in FIG. 5 quickly and automatically propagates the first and second voltages along the streamer, from its head to its tail, without the need to wait for the booting or rebooting of the second local controllers 420, each of which takes seconds for starting.

Figure 6:
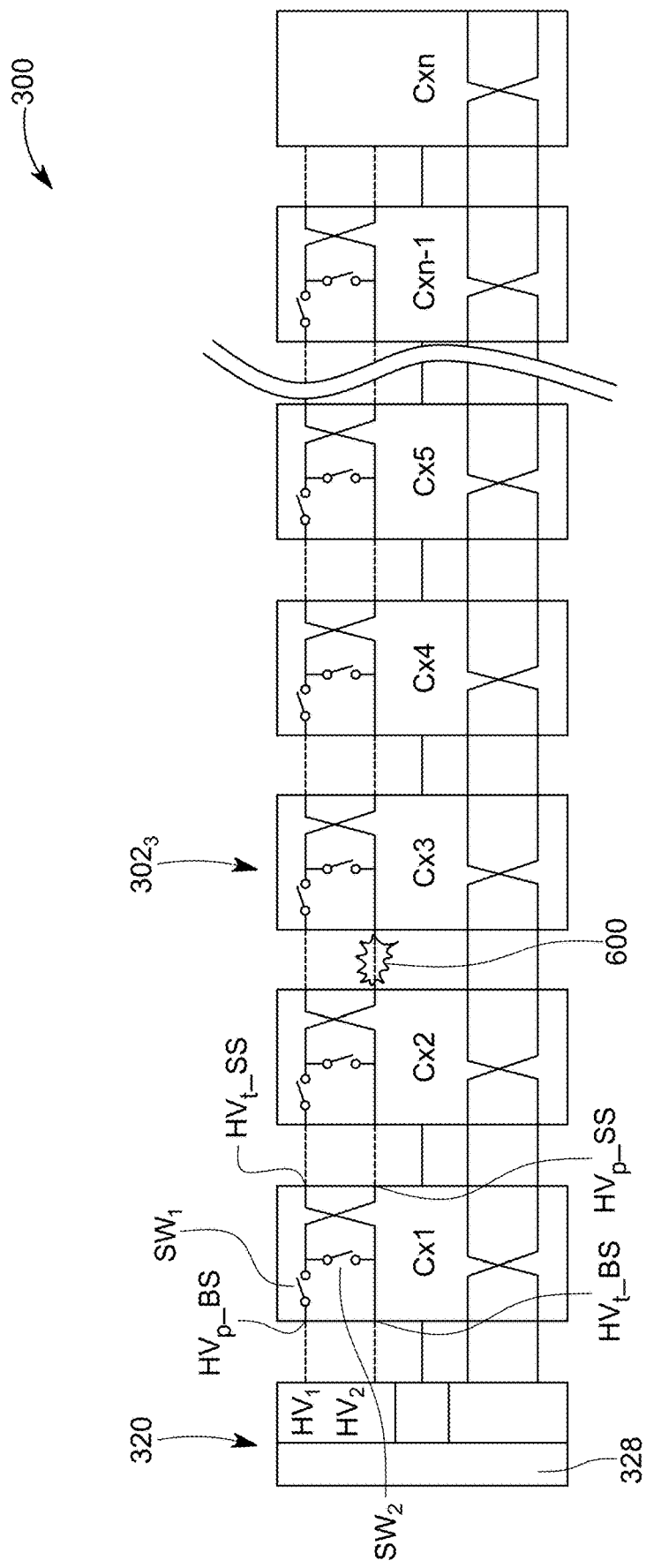
FIG. 6 illustrates a scenario when a fault is present along a high-voltage rail, which prevents the automatic voltage propagation along the streamer.

However, if there is a fault 600 along the streamer 300, as shown in FIG. 6, then a concentrator $302_3$ located immediately after the fault detects the fault as its first local controller would not detect the first voltage followed by the second voltage as discussed above. If this is the case, that concentrator $302_3$ may be configured to send a signal back to the global controller 328 informing that there is a problem along the streamer 300. Under this scenario, the HV automatic propagation procedure has failed to propagate the voltage along the entire streamer, and a novel procedure is now described for still making the streamer functional. However, this new procedure involves software commands from the second local controller, which means that the 30 s streamer detection requirement is not any more respected until the fault is isolated. However, after the fault is marked with corresponding software flags, the HV automatic voltage propagation procedure is again available.

After the global controller 328 on board the vessel has received an indication that there is a fault along the streamer (for a fault at the concentrator, the operator would see the faulty concentrator directly on the screen that monitors the system, and for the HV line, the operator see no voltage propagation, and thus can discriminate the fault associated with the concentrator from the fault associated with the HV rails), the following procedure may be implemented to restore the functionality of the streamer. Initially, a step by step identification of each concentrator is performed to determine where the fault is located. Then, the step by step identification process is relaunched to add software flags where the fault is located and to force the closure of some of the switches of the concentrators around the fault. After the fault is located and flagged, the HV automatic propagation is restarted. Note that while the HV automatic propagation, with or without faults takes place in a time shorter than 30 s, the step by step identification of the fault and the placement of the flags violates this condition.

Also note that some faults that may take place on the streamer are not possible to be isolated. For example, if no voltage is detected on both the first and second HV rails, i.e., no power and no control is available to the streamer, the above procedures cannot be implemented. This happens when the two HV rails are completely cut off, either on board of the vessel or along the streamer, or the various segments of the streamer are poorly connected to each other. Also, the restoration procedures to be discussed next are not available if there are shortcuts on both HV rails, i.e., the concentrator has failed.

Figure 7A:
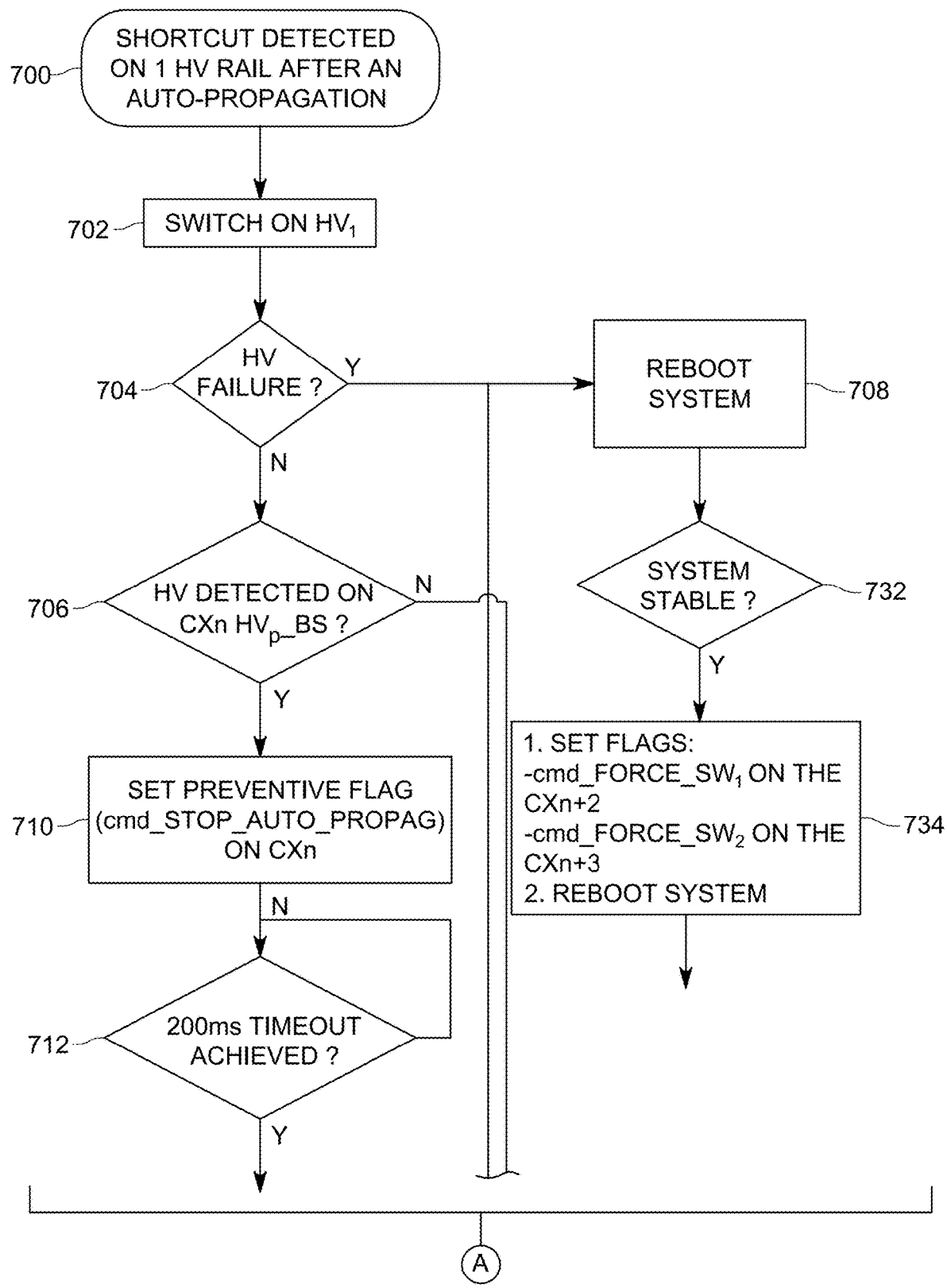
FIGS. 7A and 7B illustrate a flowchart of a method for identifying the fault along the streamer and placing various software flags before and after the fault for being able to restart the streamer in a quick manner.
Figure 7B:
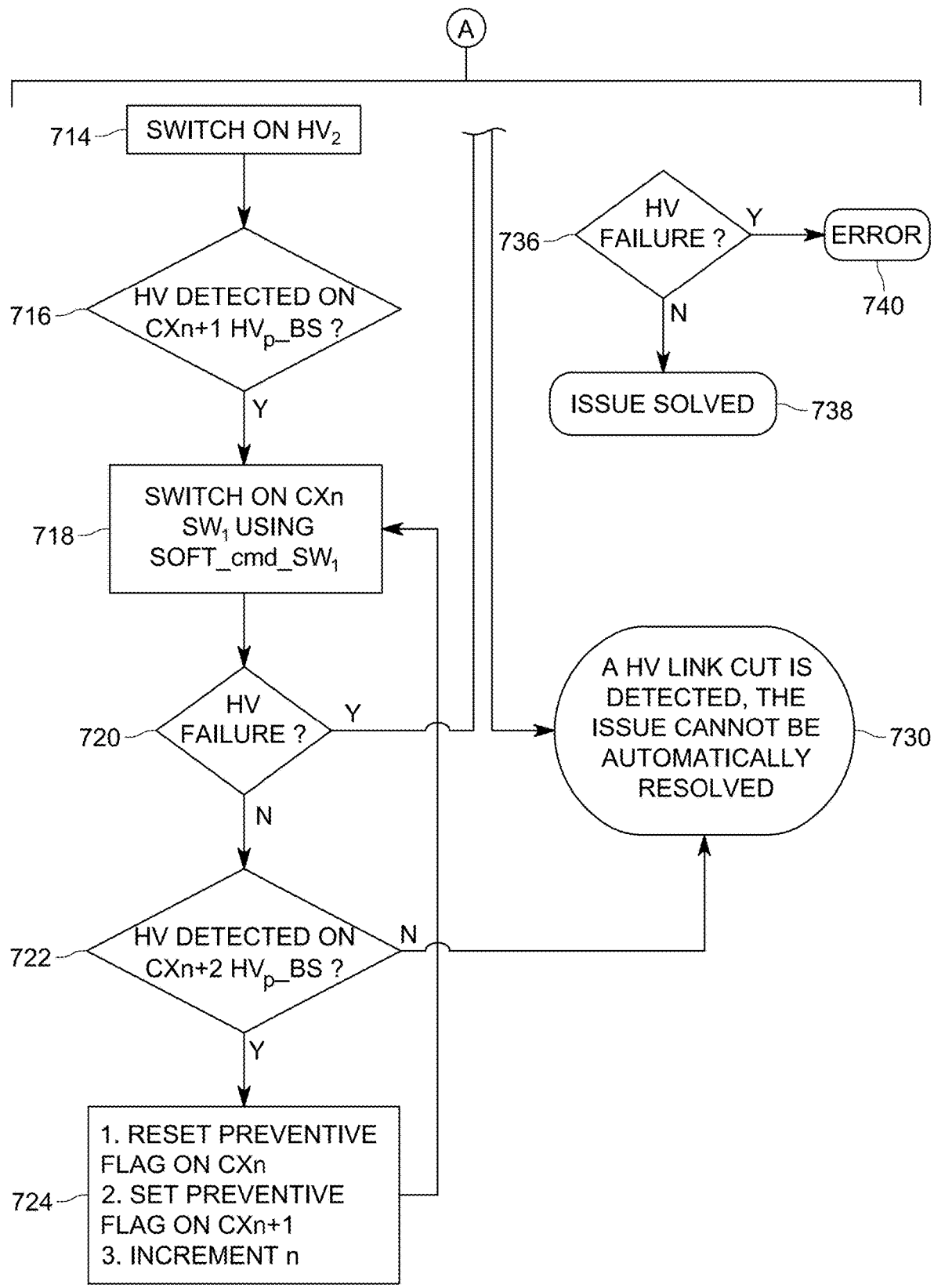

The case in which a fault (e.g., a shortcut) is present on only one of the first and second rails is now discussed with regard to FIGS. 7A and 7B. Note that in this embodiment it is assumed that there is no fault in any of the concentrators. In step 700, a voltage automatic propagation procedure along the first and second rails has been attempted, as discussed above with regard to FIG. 5. One of the concentrators has reported a faulty condition and the two HV rails have been disconnected from the voltage source at the vessel. Thus, in step 702 the global controller 328 applies the first voltage to the first rail HV1. If no HV failure signal is received in step 704 by the global controller 328, then the method advances to step 706 to detect the first voltage on the first rail HV1 at the HVp_BS port. If an HV failure signal is received in step 704, the system is rebooted in step 708, as discussed later.

Figure 8A:
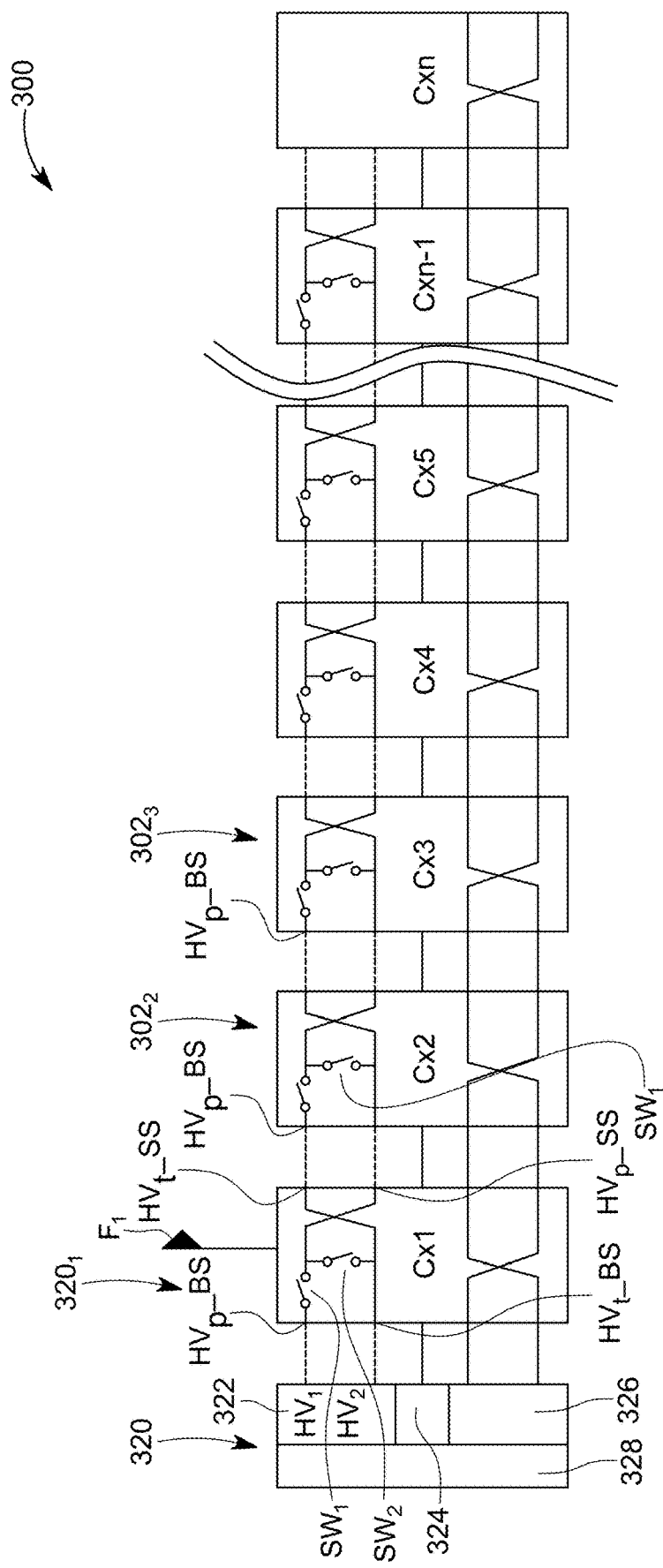
FIGS. 8A to 8E illustrate the placement of the software flags.

If the first voltage is detected on the first rail HV1 at the port HVp_BS in step 706, and no HV failure has been detected, then the method advances to step 710, where a first software flag F1 is set in the corresponding concentrator. Note that when the first voltage propagates along the first rail HV1 to the first concentrator $302_1$, this concentrator is powered up and thus, all its electrical components are ready to operate. The first flag F1, which is called herein cmd_stop_auto_propag, is added to stop the automatic propagation of the first and second voltages at the first local controller 410, i.e., to prevent the first local controller 410 to automatically close the first switch SW1. The setting of the first flag F1 is illustrated in FIG. 8A. This flag ensures that the second local controller 420 controls when the first switch SW1 is closed, i.e., the control of the first switch SW1 is taken from the first controller 410 during the step-by-step procedure.

As a safety measure, in step 712, the global controller 328 may be configured to wait for 200 ms (or any other desired value), after the corresponding timer 412 in the first controller 410 is started, before applying the second voltage on the second rail HV2. Because the second voltage is applied after the predetermined time of the timer 412, the first local controller 410 is in fact prevented to turn on the first switch SW1. However, step 712 is optional because the first flag F1 added in step 710 is already preventing the first local controller 410 to turn on the first switch SW1.

When the second rail HV2 is powered on in step 714, the applied second voltage goes through the first concentrator $302_1$ and arrives at the HVp_BS port of the second concentrator $302_2$, in essence powering it on. Note that because of the specific crossing of the first and second rails in each of the concentrators, when the second rail is powered on, the next concentrator is also powered on. Thus, at step 714, two consecutive concentrators are powered on.

In step 716, the first local controller 410 of the second concentrator $302_2$ detects the second voltage at the HVp_BS port. In step 718, as the second local controller 420 of the first concentrator $302_1$ has detected both the first and the second voltages on the first and second rails, generates a software command soft_cmd_SW1, locally, in the concentrator, which is sent to the first switch SW1 to close. Note that the closure of the first switch SW1, in the step-by-step method of FIGS. 7A and 7B, is issued and implemented by the second local controller 420, which is different from the automatic propagation procedure of FIG. 5, where the first controller 410 instructs the first switch SW1 to close, based on the hardware management utility.

Figure 8B:
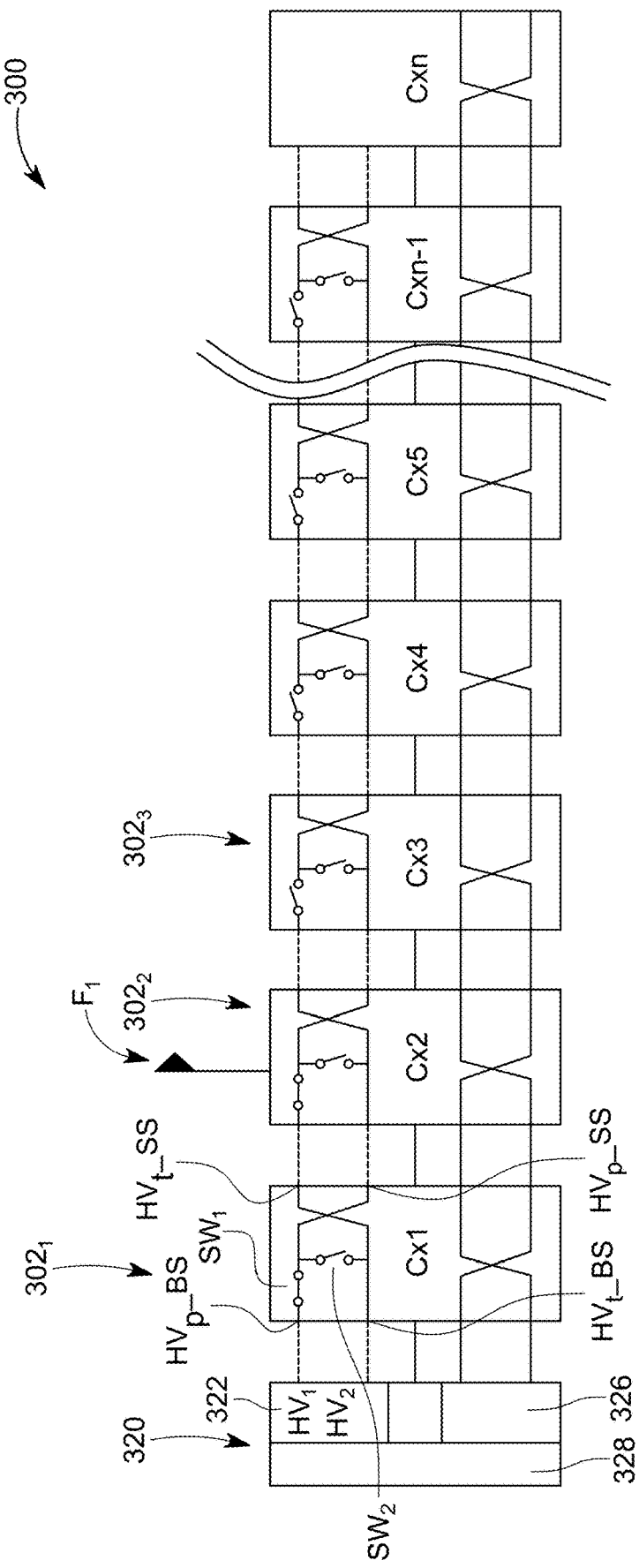

In step 720, as the first voltage propagates along the first switch SW1, through the second concentrator $302_2$, to the HVp_BS port of the third concentrator $302_3$, an HV failure signal is monitored in step 720 (for example, if no HV is detected on the concentrator port, information to that effect is returned to the global controller). If the HV failure signal is received, then the method returns to step 708. If no HV failure signal is detected, the method advances to step 722, where the first local controller of the third concentrator $302_3$ determines whether the HV voltage is detected on the HVp_BS port. If the answer is yes, then the method removes the first flag F1 from the first concentrator $302_1$ in step 724, sets the first flag F1 on the second concentrator $302_2$, and then returns to step 718 to switch on, in software, the first switch SW1 of the second concentrator $302_2$, as shown in FIG. 8B. Note that in steps 706 and 722, if the voltage is not detected on the first rail (for the case of two HV rails, for more than two HV rails this step will be modified to detect the voltage on another rail), then the method advances to step 730, in which the operator of the streamer is informed that a HV link is cut and the issue cannot be automatically resolved.

Figure 8C:
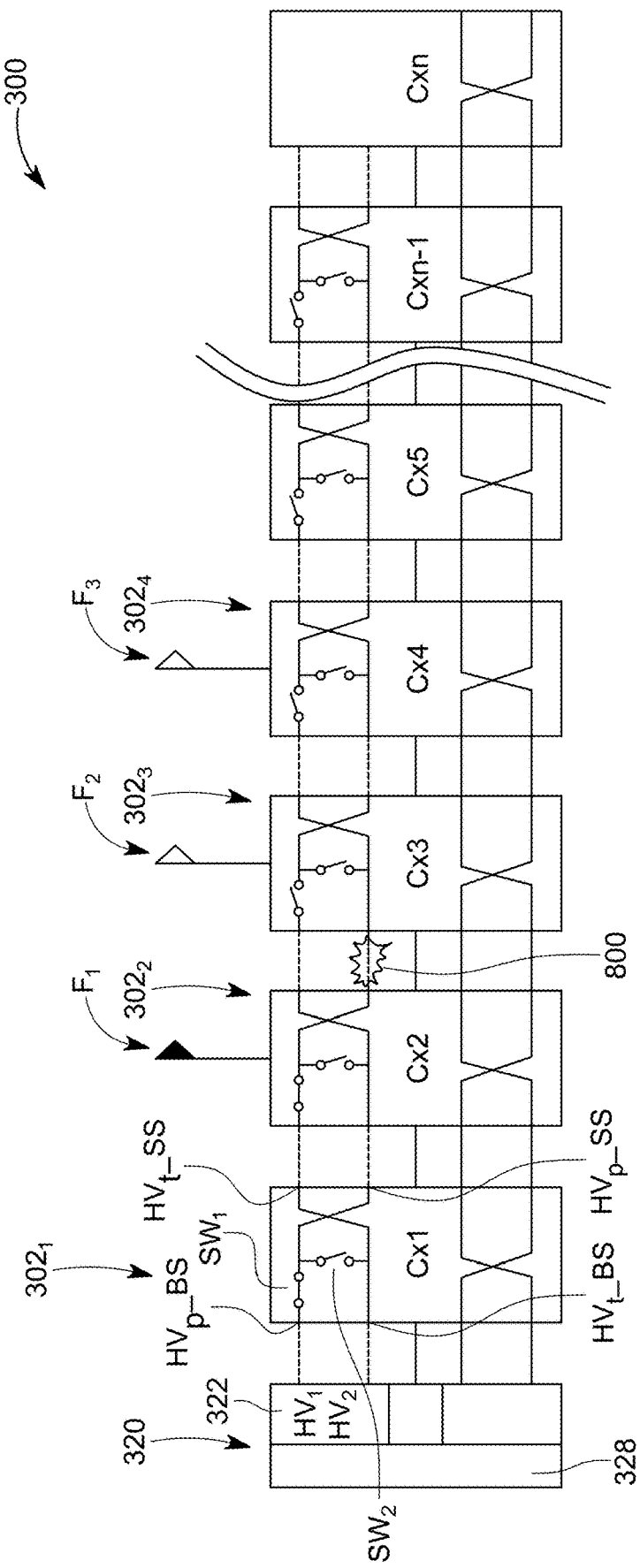

As the method circles through steps 718 to 724 repeatedly, when the fourth concentrator $302_4$ is supposed to be powered on by the closing of the first switch SW1 of the second concentrator $302_2$, and the global controller detects the fault 800 (see FIG. 8C) in step 720, the method returns to step 708, for rebooting the system. In step 732, various internal checks of the system are performed to determine that the system is stable, and in step 734, the global controller 328 sets the following two flags: a second flag F2 (that forces the switch SW1 to close), on the third concentrator $302_3$, that indicates the need to force the closure of the first switch SW1 on the third concentrator $302_3$, when the automatic propagation of the voltage is restarted, and a third flag F3 (that forces the switch SW2 to close), on the fourth concentrator $302_4$, that indicates the need to force the closure of the second switch SW2 on the fourth concentrator $302_4$, when the automatic propagation of the voltage is restarted. Note that the second flag F2 is used by the first local controller to close the first switch SW1, so that no rebooting time is necessary for the automatic propagation of the voltage. The same is true for the third flag F3, i.e., the first local controller of the concentrator that has the third flag F3 automatically closes the second switch SW2, so that no booting time is wasted.

The second flag F2 closes the first switch SW1 of the third concentrator to provide voltage downstream, because, due to the location of the fault 800 just before the third concentrator, when the automatic voltage propagation procedure is started, the first controller 410 of the third concentrator would not be able to close the first switch SW1 as no voltage would be detected on the second rail HV2 at the third concentrator.

The third flag F3 closes the second switch SW2 of the fourth concentrator to provide the voltage from the first rail HV1 to the second rail HV2, as the second rail HV2 at the fourth concentrator cannot receive a voltage from the power source 322, due to the fault 800 along the second rail.

With the three flags F1 to F3 in place around the fault 800, the method reboots in step 734 the system and runs now the automatic voltage propagation procedure. If no HV failure is determined in step 736, then the method concludes in step 738 that the original fault 800 has been by-passed and the streamer is operational and ready to collect the seismic data. However, if the method concludes that there is an HV failure in step 736, the method informs the operator of the vessel in step 740 that there is still an error and the streamer cannot be restarted.

Figure 8D:
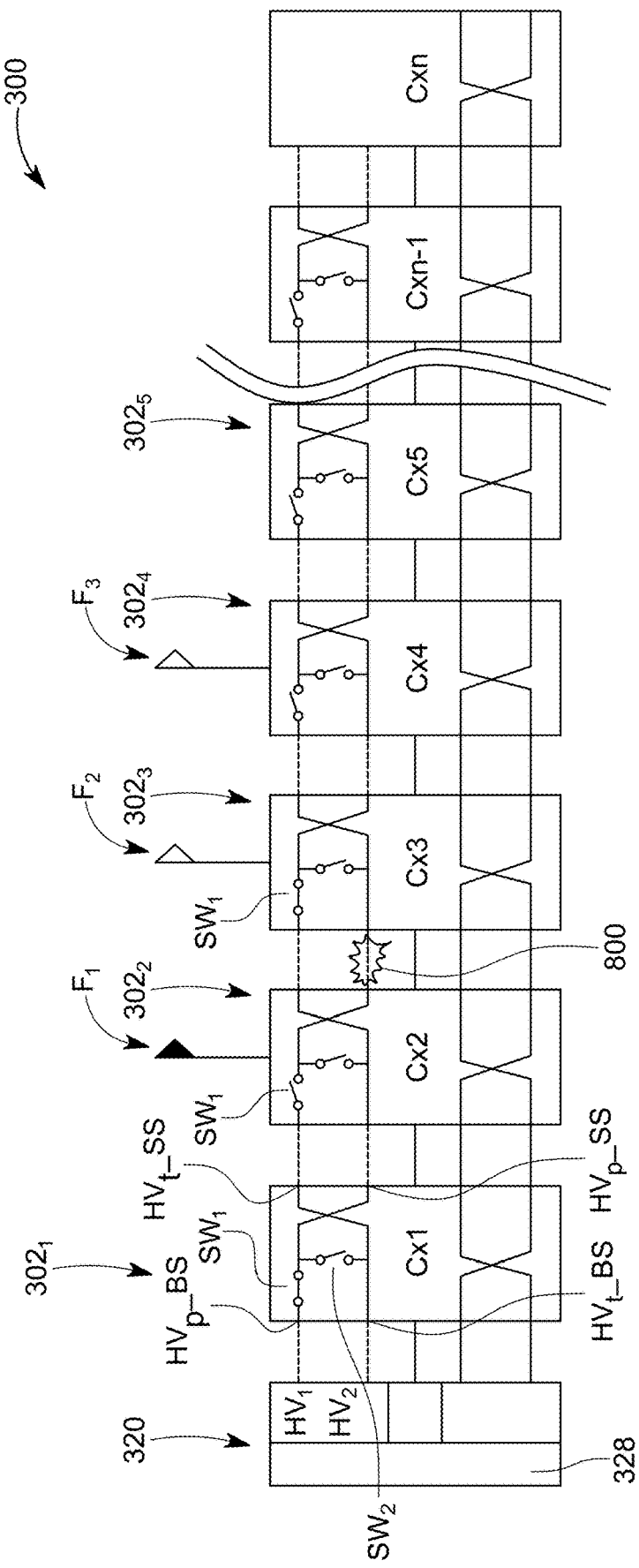
Figure 8E:
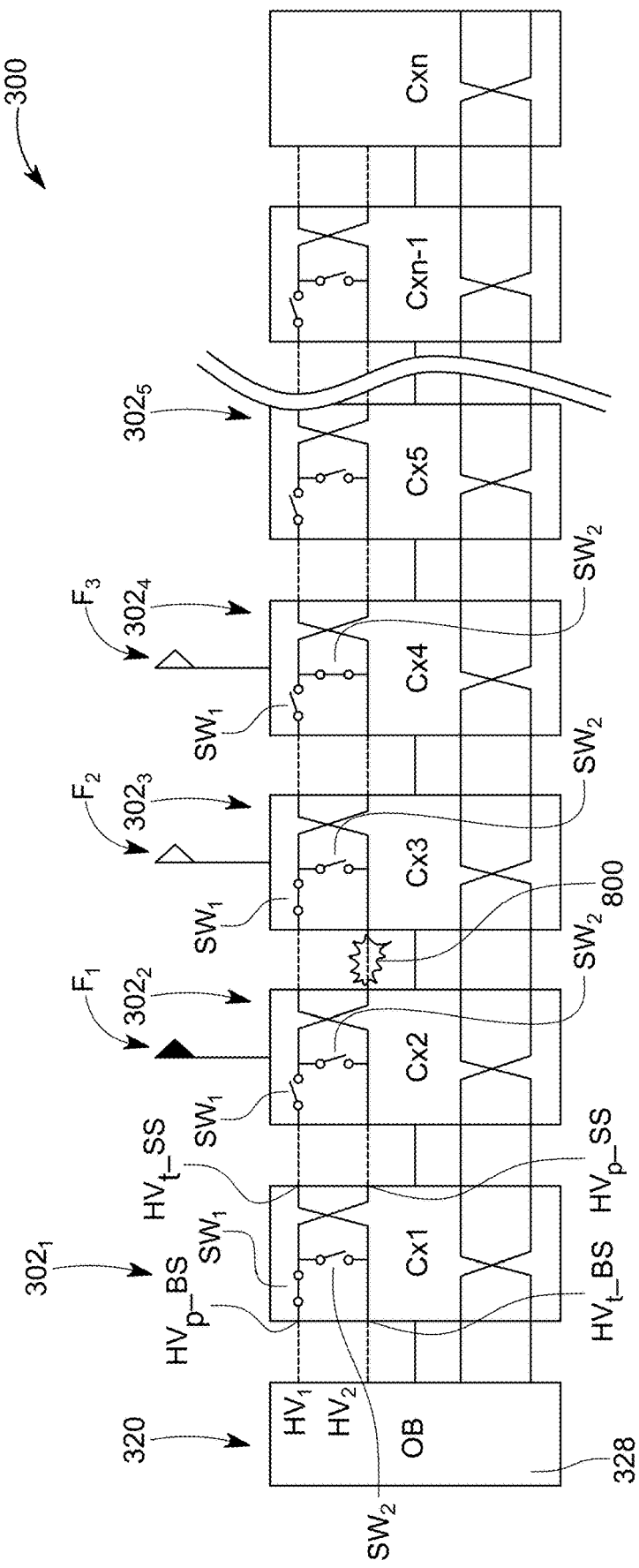
Figure 9:
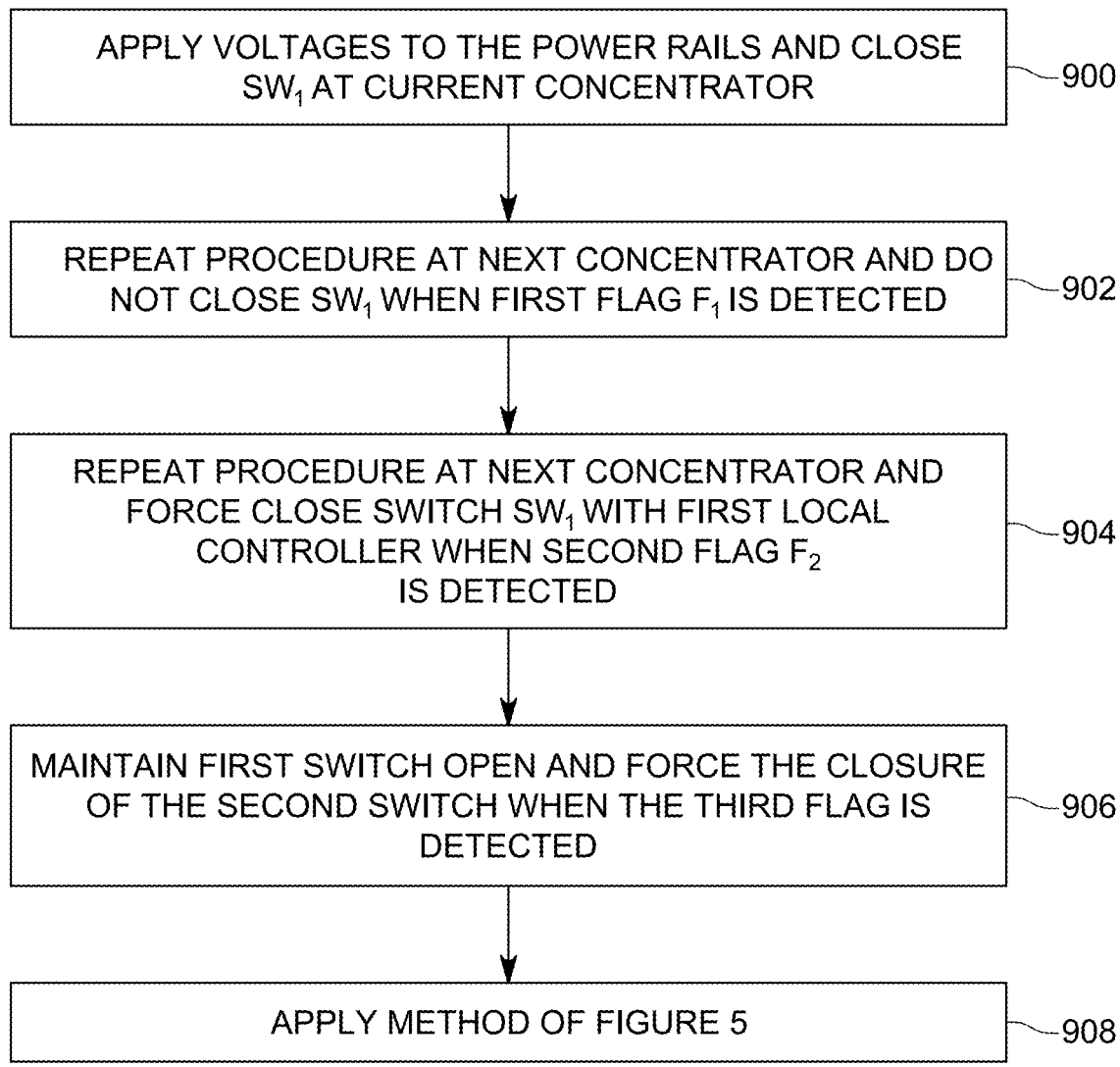
FIG. 9 is a flowchart of a method for automatically propagating a voltage along the streamer when there is a fault and plural software flags have been placed on the streamer to identify and bypass the fault.

The automatic voltage propagation procedure in the presence of the fault 800 and the three flags F1 to F3 is now discussed with regard to FIGS. 8D to 9. In step 900, the first and second voltages are applied, in turn, to the first concentrator, as discussed above with regard to FIG. 5. The step 900 includes applying the first voltage, by the global controller 328, to the first rail HV1, similar to step 500 discussed above. The first concentrator is powered on similar to step 502 and the first local controller 410 detects the first voltage at the HVp_BS port. Similar to step 504, the timer 412 of the first local controller 410 is started and the second voltage is applied similar to step 506 by the global controller 328 to the second rail HV2. The first local controller 410 detects this second voltage similar to step 508, and checks in step 510 whether the condition that the second voltage has been detected in a time less than the predetermined time counted by the timer 412 is true. If the answer is yes, then the first local controller 410 automatically closes the first switch SW1, so that the first voltage is propagated to the second and third concentrators.

When the same procedure is repeated in step 902, at the second concentrator $302_2$, the presence of the first flag F1 prevents the first local controller 410 to close the first switch SW1. Thus, the upstream part of the fault 800, along the second rail HV2, is insulated. In fact, the presence of the first flag F1 also prevents the closing of the second switch SW2.

When the same procedure is repeated in step 904, at the third concentrator $303_3$, the presence of the second flag F2 makes the first local controller 410 of the third concentrator $302_3$ to close the first switch SW1, so that the voltage can propagate to the fifth concentrator. Note that the first local controller closes the first switch SW1 although no second voltage is detected at the second rail HV2 because to the fault 800. This behavior of the first local controller is due to the presence of the second flag F2.

At this time, as illustrated in FIG. 8D, the first switch SW1 of the second concentrator $302_2$ is open, the first switches for the first and third concentrators $302_1$ and $302_3$ are closed, and the second switches SW2 of all the concentrators are opened. Returning to FIG. 9, in step 906, the voltage of the first rail HV1 is powering the fourth concentrator $302_4$ as the first switch SW1 of the third concentrator $302_3$ has been closed (note that the voltage of the second rail HV2 is prevented by the fault 800 to arrive at the four concentrator). The third flag F3 makes the second local controller 420 to take control, as the first local controller 410 of the fourth concentrator has not closed the first switch SW1 (due to the timer condition discussed above), and the second local controller 420 closes the second switch SW2, so that the voltage from the first rail HV1 is applied (propagated) to the second rail HV2, and thus, the voltage on both rails HV1 and HV2 is reestablished downstream from the fault 800. The fact that the first switch SW1 is kept open at the fourth concentrator insulates the fault 800 on the downstream part of the fault, as illustrated in FIG. 8E (note that the fault 800 is now contained between the open first switch SW1 of the second concentrator and the open first switch SW1 of the fourth concentrator). The closing of the second switch SW2 of the fourth concentrator makes the voltage on the second rail HV2 of the fifth concentrator to be on, and because the voltage on the first rail HV1 has already been present (when the first switch SW1 of the this concentrator has closed), the voltages can now propagate automatically, as discussed with regard to FIG. 5, for the rest of the streamer.

Then, in step 908, the voltage propagation along both the first and second rails, downstream of the fourth concentrator, continues as discussed above with regard to FIG. 5. Note that during the automatic voltage propagation in the presence of a fault 800 as illustrated in FIG. 8E, although the flags F1 to F3 were generated using the second local controller 420, they modify the behavior of the first local controller 410, so that the automatic voltage procedure does not involve the booting or rebooting of the second local controllers. In other words, the first local controllers 410 are by default configured to close the first switch SW1 when a certain condition happens, and not to close the second switch SW2. However, in the presence of a flag, which is generated by the second local controller, the first local controller modifies its functionality to (1) not close the first switch SW1 regardless of whether the predetermined condition takes place, for the first flag, (2) close the first switch SW1 regardless of whether the predetermined condition takes place, for the second flag, or (3) close the second switch SW2, for the third flag.

The rerouting voltage procedure discussed above may be implemented when certain conditions are detected.

Figure 10A:
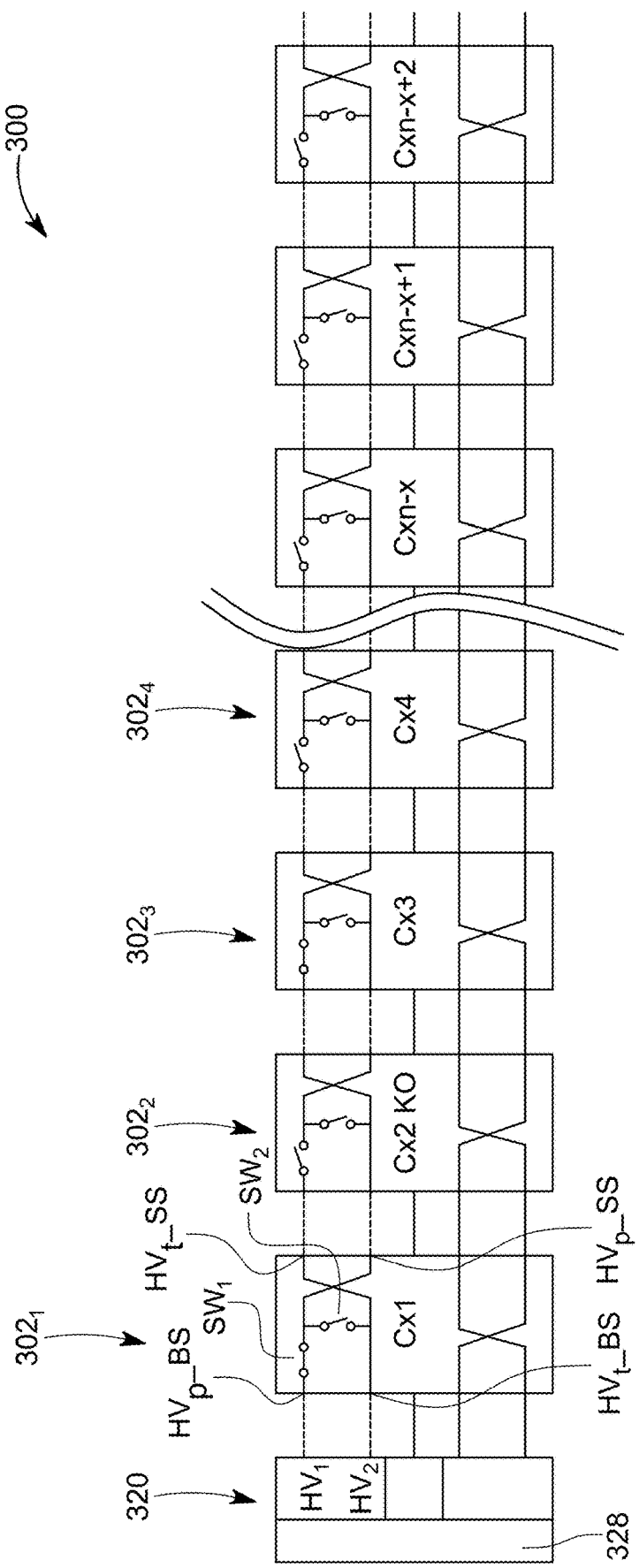
FIGS. 10A to 10C illustrate the use of software flags when a concentrator of the streamer is not responsive.

FIG. 10A shows a streamer 300 in which HV propagation is not possible on the second concentrator $302_2$. This means that this embodiment assumes that there is no fault along the HV rails, but there is a fault in one of the concentrators along the HV rails. FIG. 10A shows the first switch SW1 for the first and third concentrators being closed and the first switch SW1 for the second concentrator being open. This means that the HV rails power the concentrators of the streamer up to the concentrator Cx(n-x), with n being the number of concentrators connected to power and x the number of concentrators that are connected to a single rail, but that single rail cannot fully power them.

Figure 10B:
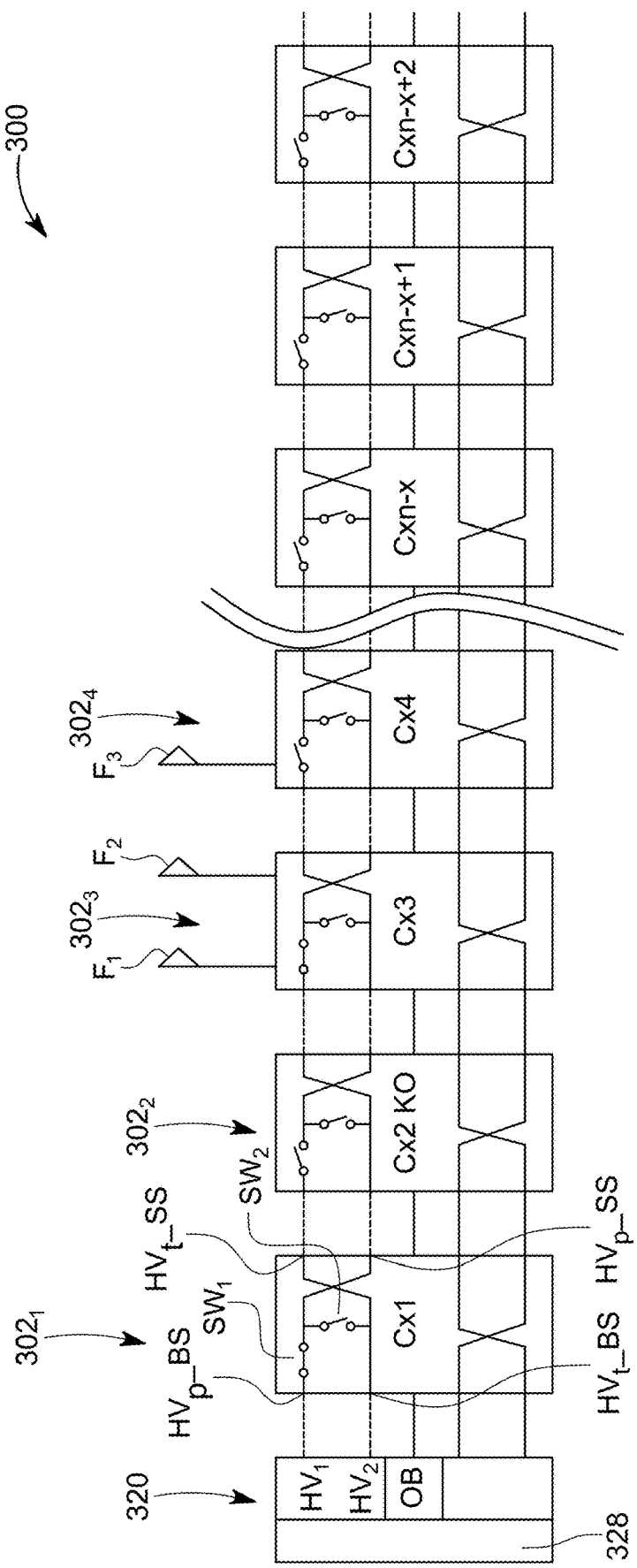
Figure 10C:
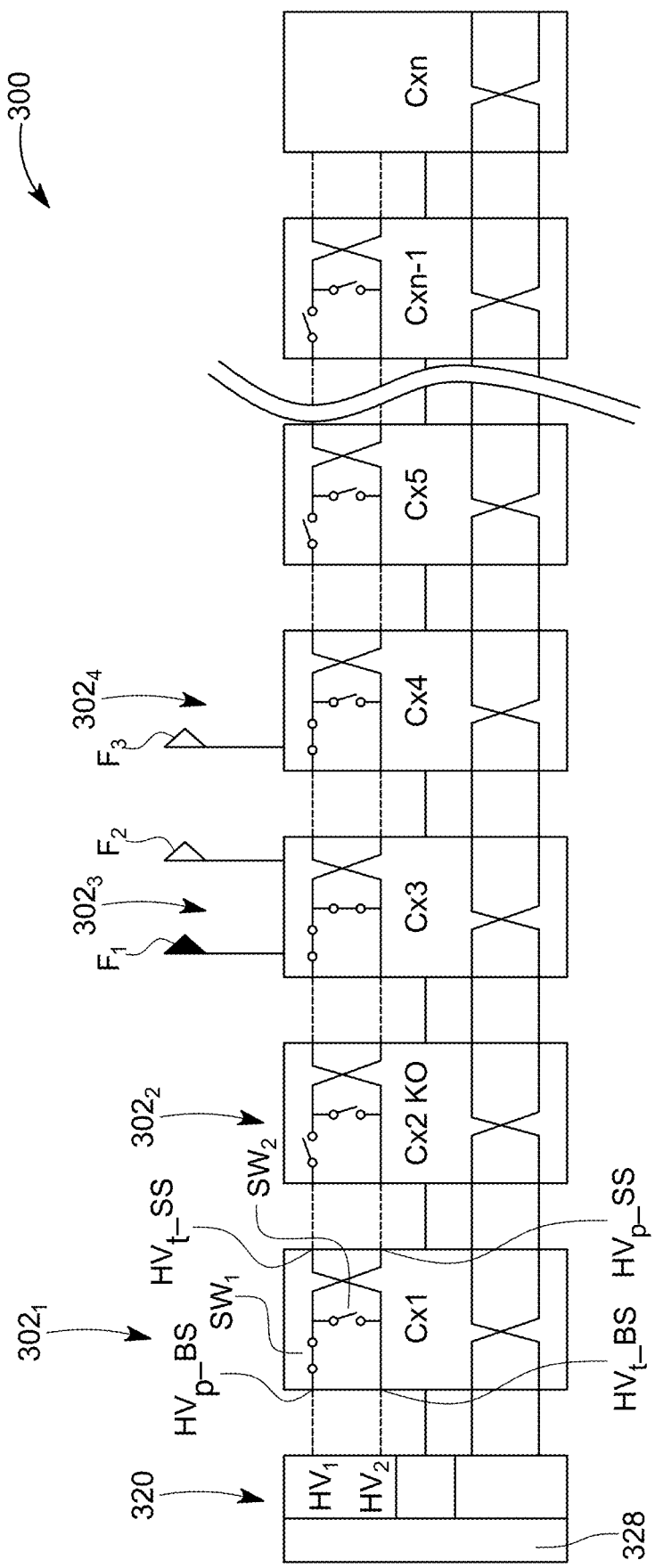

Under these circumstances, the operator of the streamer can use a software command soft_cmd_SW2 on the third concentrator and a software command soft_cmd_SW1 on the fourth concentrator to make a new and quick identification of all the elements of the streamer. Then, to make the automatic voltage propagation procedure possible the next time the streamer is booted, flags are positioned, using the second local controllers, on the two concentrators immediately downstream from the faulty concentrator, in this case, the third and fourth concentrators, as illustrated in FIG. 10B. The first flag F1 (note that this first flag F1 associated with a fault on the concentrator is different from the flag F1 in FIGS. 8A to 8C that is associated with a fault on the HV rails) instructs the first local controller of the third concentrator in this figure to force close the corresponding first switch SW1, the second flag F2, which is placed on the same concentrator as the first flag, instructs the first local controller to force close the second switch SW2, so that the voltage is replicated from one rail onto the other, and the third flag F3, which is placed on the next concentrator downstream, instructs the first local controller to close the first switch SW1, so that the configuration shown in FIG. 10C can be achieved. In this way, the first flag F1 ensures that the working rail HV1 is closed so that its voltage moves downstream, the second flag F2 ensures that the interrupted second rail HV2 is energized with a voltage from the first rail HV1, and the third flag F3 ensures that the fourth concentrator (second concentrator after the faulty concentrator) propagates the first and second voltages along the first and second rails although the condition noted in step 510 in FIG. 5 is not fulfilled. After this, the remaining concentrators work as described in FIG. 5.

Figure 11:
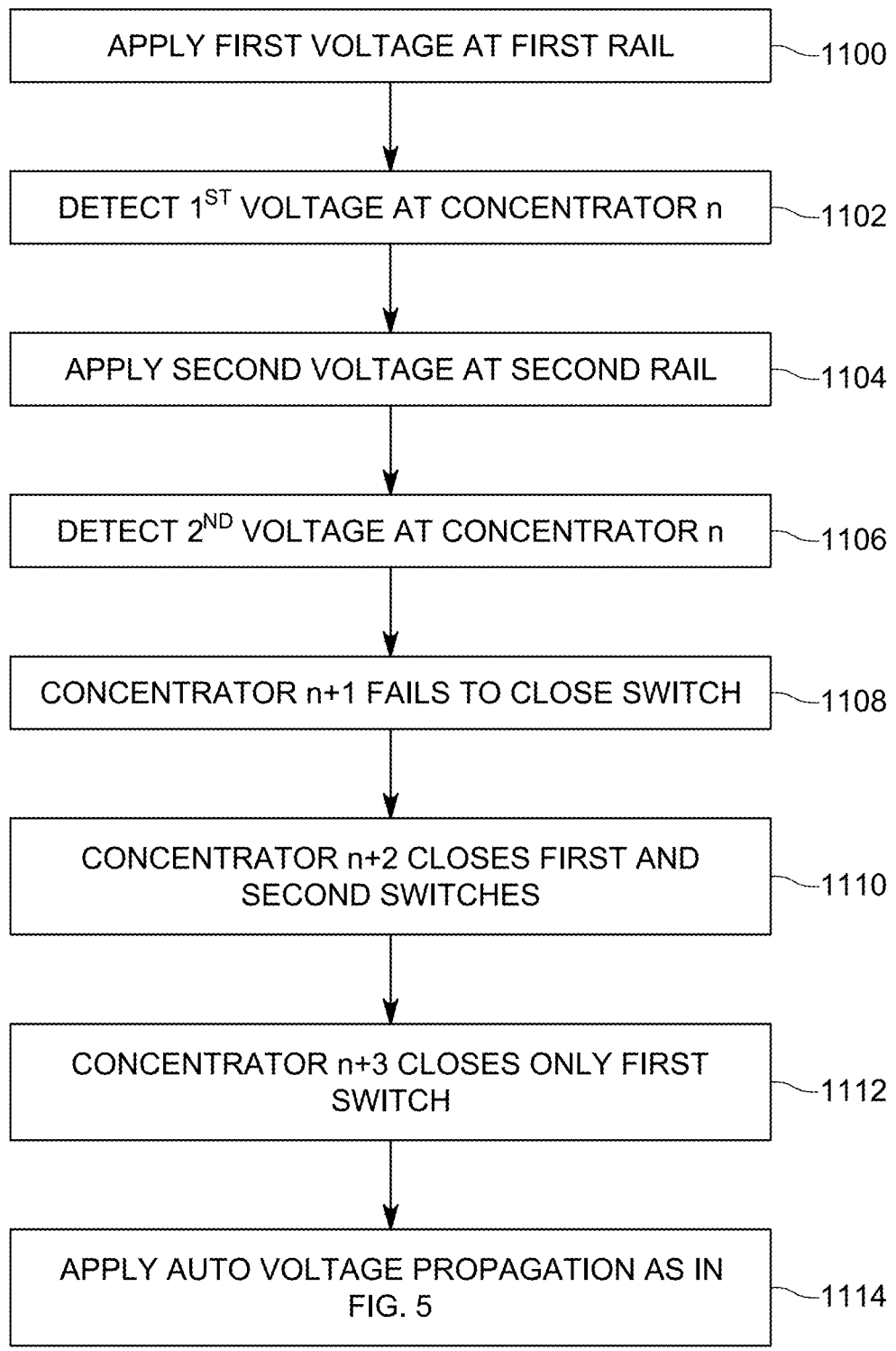
FIG. 11 is a flowchart of a method for automatic voltage propagation along a streamer when one concentrator is not responsive and plural software flags have been placed on the streamer.

Having these flags in place, the automatic voltage propagation procedure can now be run as described in FIG. 11. In step 1100, the first voltage is applied to the first rail HV1 by the global controller 328. The first voltage is detected in step 1102 by the first concentrator $302_1$ at the HVp_BS port and the concentrator is powered up. In step 1104, the second voltage is applied to the second rail HV2 by the global controller and in step 1106, the second voltage is detected by the first concentrator at the HVt_BS port. If the first concentrator detects the two voltages within the time counted by the timer, then the first local controller 410 of the first concentrator closes the first switch SW1 and propagates the voltage to the third concentrator $302_3$. In step 1108, the second concentrator $302_2$ fails to close the first switch SW1 as it has malfunctioned. This means, that voltage at the HVt_BS port of the third concentrator is not received, only at the HVp_BS port.

In step 1110, the first local controller 410 of the third concentrator $302_3$ forces close the first switch SW1 due to the presence of the first flag F1, and also forces close the second switch SW2 due to the presence of the second flag F2, as illustrated in FIG. 10O. This means that the voltage on the second rail is reestablished (due to the second switch SW2) and the fourth concentrator receives voltages along both rails HV1 and HV2.

In step 1112, because of the third flag F3 on the fourth concentrator, the first local controller 410 closes the first switch SW1 and from now on, the automatic voltage propagation procedure proceeds as described in FIG. 5. Although the embodiments discussed above used as examples the first to fourth concentrators and a fault located between the second and third concentrators, one skilled in the art would understand that all the methods and procedures introduced above also apply to any n to n+4 concentrators, where n can be any integer number that describes a concentrator in the chain of concentrators and the fault is located between concentrators n+1 and n+2.

Figure 12:
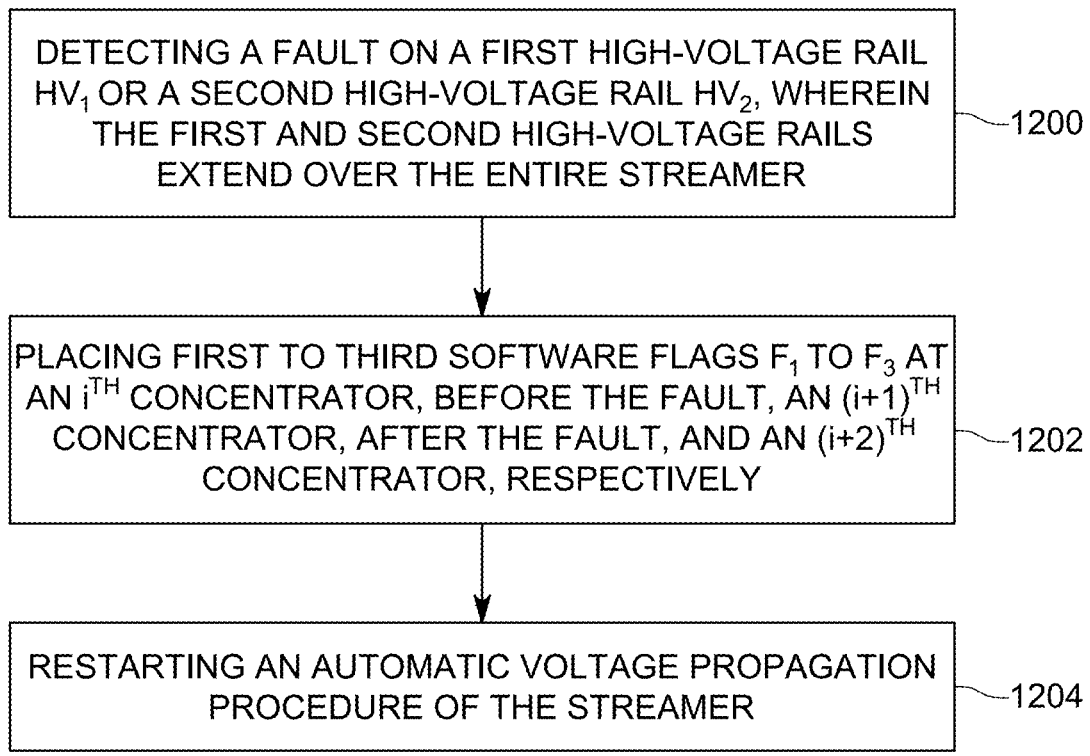
FIG. 12 is a flowchart of a method for detecting a fault along a streamer and placing plural software flags along the streamer to enable automatic voltage propagation along the streamer.

A method for identifying and insulating a fault in a marine seismic streamer (along an HV rail and not in a concentrator) is now discussed with regard to FIG. 12. The method includes a step 1200 of detecting a fault 800 on a first high-voltage rail HV1 or a second high-voltage rail HV2, wherein the first and second high-voltage rails extend over the entire streamer 300, a step 1202 of placing first to third software flags F1 to F3 at an ith concentrator, before the fault 800, an (i+1)th concentrator, after the fault, and an (i+2)th concentrator, respectively, and a step 1204 of restarting an automatic voltage propagation procedure of the streamer. The first to third flags F1 to F3 are controlling a first local controller in a corresponding concentrator, the first to third flags F1 to F3 are generated by a second local controller in the corresponding concentrator, and the second local controllers are slower to reboot than the first local controllers.

The first software flag F1 is configured to force the first local controller of the ith concentrator to open or to prevent to close a first switch SW1, which interrupts the first high-voltage rail HV1. The second software flag F2 is configured to force the first local controller of the (i+1)th concentrator to close a corresponding first switch SW1 to propagate the voltage along the first high-voltage rail HV1. The third software flag F3 is configured to force the first local controller of the (i+2)th concentrator to close a corresponding second switch SW2, that connects the first high-voltage rail HV1 to the second high-voltage rail HV2.

The streamer has plural concentrators in addition to the ith, (i+1)th, and (i+2)th concentrators, and each concentrator has a corresponding first switch SW1 and a corresponding second switch SW2, and each concentrator receives a first voltage along the first high-voltage rail HV1 and a second voltage along the second high-voltage rail HV2.

A marine seismic streamer that is compatible with the methods discussed above is now discussed. The streamer includes plural concentrators 302*i*, plural segments 310*i* interposed with the plural concentrators 302*i* so that a concentrator of the plural concentrators 302*i* is sandwiched between two segments of the plural segments 310*i*, a first high-voltage rail HV1 that extends along the plural concentrators 302*i* and the plural segments 310*i*, and a second high-voltage rail HV2 that extends along the plural concentrators 302*i* and the plural segments 310*i*. For each given concentrator i of the plural concentrators (302*i*), there is a first switch SW1 placed along one of the first high-voltage rail HV1 and the second high-voltage rail HV2, and a second switch SW2, located between the first high-voltage rail HV1 and the second high-voltage rail HV2.

At each of the given concentrator i, an output of the first high-voltage HV1 is switched with an output of the second high-voltage HV2 so that a next concentrator i+1 of the plural concentrators 302*i* has a corresponding first switch SW1 along the second high-voltage rail HV2 and not on the first high-voltage rail HV1. In other words, every second concentrator of the plural concentrators has the first switch SW1 placed along the first high-voltage rail HV1 and all the other concentrators have the first switch SW1 placed along the second high-voltage rail HV2.

Any concentrator of the plural concentrators has a first local controller and a second local controller, the first local controller is separated from the second local controller, the first local controller is implemented in hardware and the second local controller is implemented in a combination of hardware and software and runs an operation system.

In one application, the first local controller boots in less than 1 s while the second local controller boots in more than 1 s. In still another application, the first local controller boots or reboots in less than one tenth of a second.

The first local controller is configured to close a corresponding first switch SW1 when a voltage on the second high-voltage rail HV2 is detected not later than a given time on the first high-voltage rail HV1. A software flag generated by the second local controller prevents the first local controller to close the corresponding first switch SW1. The second local controller is configured to receive information from a global controller located on a vessel that tows the streamer, and to generate one or more software flags. The one or more software flags are configured to change a behavior of the first local controller. In one application, a first software flag prevents the first local controller to close a corresponding first switch SW1, a second software flag forces the first local controller to close the first switch even if a voltage on the second high-voltage rail is received later than a given time or before a voltage on the first high-voltage rail, and a third software flag forces the first local controller to close the second switch.

Figure 13:
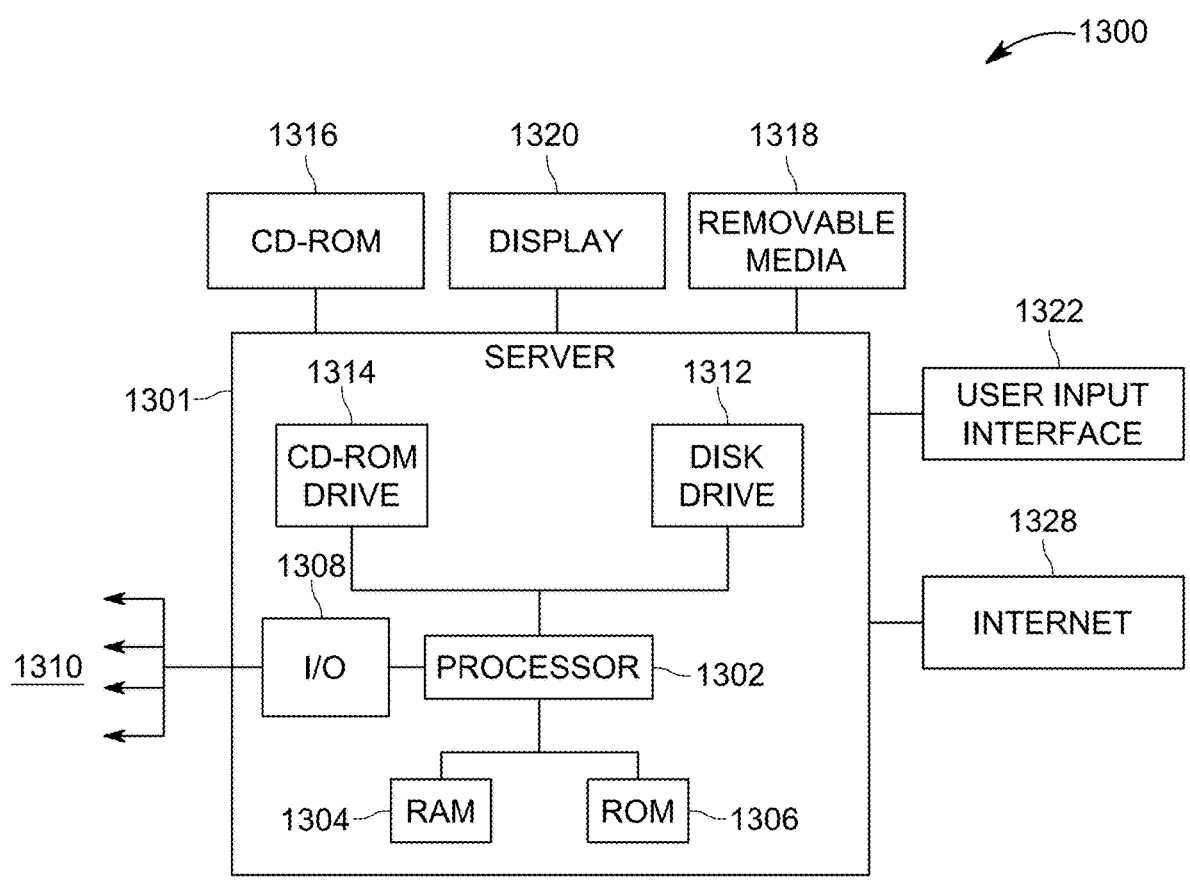
FIG. 13 is a schematic diagram of a computing device that implements the methods discussed above.

The above methods and controllers may be implemented in a computing system specifically configured for seismic acquisition. An example of a representative computing system capable of carrying out operations in accordance with the exemplary embodiments is illustrated in FIG. 13. This computing system may be implemented as any of the local first and second controllers, and/or the global controller discussed above. Hardware, firmware, software or a combination thereof may be used to perform the various steps and operations described herein.

The computing system 1300 suitable for performing the activities described in the exemplary embodiments may include a server 1301. Such a server 1301 may include a central processor (CPU) 1302 coupled to a random access memory (RAM) 1304 and to a read-only memory (ROM) 1306. The ROM 1306 may also be other types of storage media to store programs, such as programmable ROM (PROM), erasable PROM (EPROM), etc. The processor 1302 may communicate with other internal and external components through input/output (I/O) circuitry 1308 and bussing 1310, to provide control signals and the like. The processor 1302 carries out a variety of functions as are known in the art, as dictated by software and/or firmware instructions.

The server 1301 may also include one or more data storage devices, including a hard drive 1312, CD-ROM drives 1314, and other hardware capable of reading and/or storing information such as DVD, etc. In one embodiment, software for carrying out the above-discussed steps may be stored and distributed on a CD- or DVD-ROM 1316, removable memory device 1318 or other form of media capable of portably storing information. These storage media may be inserted into, and read by, devices such as the CD-ROM drive 1314, the disk drive 1312, etc. The server 1301 may be coupled to a display 1320, which may be any type of known display or presentation screen, such as LCD, LED displays, plasma displays, cathode ray tubes (CRT), etc. A user input interface 1322 is provided, including one or more user interface mechanisms such as a mouse, keyboard, microphone, touchpad, touch screen, voice-recognition system, etc.

The server 1301 may be coupled to other computing devices, such as landline and/or wireless terminals via a network. The server may be part of a larger network configuration as in a global area network (GAN) such as the Internet 1328, which allows ultimate connection to various landline and/or mobile client devices. In one application, computing system 1300 is a dedicated system that is tailored for being deployed on a vessel, and also for interacting with the navigation system of the vessel.

The disclosed embodiments provide a system and a method for quickly activating a streamer in a case of boot or reboot. Although various components of the streamer need a long time to boot or reboot, by using a combination of hardware implemented utilities and also software flagging technique, it is possible to not involve those components that take a long time to reboot when rebooting the streamer. Due to these features and also due to the specific wiring of the streamer, it is also possible to reestablish the functionality of the streamer even when one element of the streamer becomes unresponsive or faulty. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for bypassing a fault in a marine seismic streamer, which includes concentrators connecting consecutive segments housing seismic sensors, each concentrator having a first switch, SW1, along a first high-voltage rail, HV1, or along a second high-voltage rail, HV2, and a second switch, SW2, between the HV1 and the HV2, the HV1 and the HV2 extending along the segments and the concentrators of the marine seismic streamer, the method comprising:
   detecting a fault related to delivery of a first high-voltage on the HV1 and/or a second high-voltage on the HV2 during an automatic voltage propagation procedure, the fault occurring between an ith concentrator and an (i+1) concentrator of the marine seismic streamer;
   placing first to third software flags F1 to F3 at the ith concentrator, the (i+1)th concentrator, and an (i+2)th concentrator, respectively; and
   restarting the automatic voltage propagation procedure along the marine seismic streamer, the automatic voltage propagation procedure bypassing the fault based on the first to third software flags,
   wherein the first to third flags F1 to F3 are controlling a first local controller in a corresponding concentrator,
   wherein the first to third flags F1 to F3 are generated by a second local controller in the corresponding concentrator, and
   wherein the first controller and the second controller control the respective SW1 and SW2, and the second local controllers are slower to reboot than the first local controllers.

2. The method of claim 1, wherein the first software flag F1 is configured to force the first local controller of the ith concentrator to open the corresponding SW1 thereby interrupting the HV1, the first local controller being electrically connected to the SW1 and configured to close or open the SW1.

3. The method of claim 2, wherein the second software flag F2 is configured to force the first local controller of the (i+1)th concentrator to close the corresponding SW1 thereby propagating the second high-voltage along the HV2.

4. The method of claim 3, wherein the third software flag F3 is configured to force the second local controller of the (i+2)th concentrator to close the corresponding SW2, thereby connecting the HV1 to the HV2, the second local controller being electrically connected to the SW2 and configured to close or open the SW2.

5. The method of claim 1, wherein the marine seismic streamer has plural concentrators in addition to the ith, (i+1)th, and (i+2)th concentrators, and each concentrator of the plural concentrators in addition to the ith, (i+1)th, and (i+2)th concentrators includes a corresponding SW1 placed on the HV1 or the HV2.

6. The method of claim 1, wherein the automatic voltage propagation procedure comprises providing the first high-voltage on the HV1 and the second high-voltage on the HV2 to each of the concentrators one-by-one along the marine seismic streamer.

7. The method of claim 6, wherein the fault is detected when the second high-voltage is delivered later than a predetermined time after the first high-voltage is delivered.

8. The method of claim 7, further comprising:
   starting to count a delay time at the first local controller, after detecting the first voltage, for counting down the predetermined time.

9. The method of claim 7, wherein the predetermined time is about 20 ms.

10. The method of claim 1, wherein the automatic voltage propagation procedure takes less than 30 s.

11. The method of claim 1, wherein the first local controller is hardware implemented.

* * * * *